US012581037B2

(12) United States Patent (10) Patent No.: US 12,581,037 B2
Grillo et al. (45) Date of Patent: *Mar. 17, 2026

(54) GENERATING SMART TOPICS FOR VIDEO CALLS USING A LARGE LANGUAGE MODEL AND A CONTEXT TRANSFORMER ENGINE

(71) Applicant: Dropbox, Inc., San Francisco, CA (US)

(72) Inventors: Joseph Grillo, San Francisco, CA (US); Emir Aydin, Vancouver (CA); Ritu Vincent, Alamo, CA (US); William Adamowicz, Los Angeles, CA (US)

(73) Assignee: Dropbox, Inc., San Francisco, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 18/470,885

(22) Filed: Sep. 20, 2023

(65) Prior Publication Data

US 2025/0061893 A1 Feb. 20, 2025

Related U.S. Application Data

(60) Provisional application No. 63/519,437, filed on Aug. 14, 2023.

(51) Int. Cl.
| *H04N 7/15* | (2006.01) |
| *G06F 3/0484* | (2022.01) |

(Continued)

(52) U.S. Cl.
CPC .......... *H04N 7/155* (2013.01); *G06F 3/0484* (2013.01); *G10L 15/183* (2013.01); *G10L 15/22* (2013.01);

(Continued)

(58) Field of Classification Search
None
See application file for complete search history.

(56) References Cited

U.S. PATENT DOCUMENTS 10,798,341 B1 10/2020 Hegde et al.
11,119,985 B1 9/2021 Alagianambi et al.

(Continued)

OTHER PUBLICATIONS

Relnotes, et al., "Automatically Summarize Conversations in Teams-Based Collaboration," Microsoft Learn, Apr. 28, 2023, 2 pages, Retrieved from the Internet: URL: https://learn.microsoft.com/en-us/dynamics365-release-plan/2022wave2/service/dynamics365-customer-service/auto-summarize-conversations-support-teams-based-collaboration.

(Continued)

*Primary Examiner* — Quoc D Tran
(74) *Attorney, Agent, or Firm* — Keller Preece PLLC

(57) ABSTRACT

The present disclosure relates to systems, non-transitory computer-readable media, and methods for utilizing a context transformer engine, a smart topic agent, and a large language model to generate a smart topic output. In particular, in one or more embodiments, the disclosed systems generate a smart topic output from a transcript of a video call. In some embodiments, the disclosed systems provide a smart topic interface that provides the smart topic output on a client device and receives selections of smart topic elements. In one or more embodiments, the disclosed systems generate a combined smart topic from transcripts of video calls in which client devices that participated are associated with a collaborating user account group.

20 Claims, 25 Drawing Sheets

(51) Int. Cl.

| | | |
|---|---|---|
| *G10L 15/183* | (2013.01) | |
| *G10L 15/22* | (2006.01) | |
| *G10L 15/30* | (2013.01) | |
| *H04L 65/1083* | (2022.01) | |
| *H04L 65/403* | (2022.01) | |

(52) U.S. Cl.
CPC .......... *G10L 15/30* (2013.01); *H04L 65/1083* (2013.01); *H04L 65/403* (2013.01); *H04N 7/152* (2013.01)

(56) References Cited

U.S. PATENT DOCUMENTS

| | | | | |
|---|---|---|---|---|
| 11,232,266 B1 * | 1/2022 | Biswas | .................... | G06F 40/35 |
| 11,275,891 B2 | 3/2022 | Mertens et al. | | |
| 11,595,459 B1 | 2/2023 | Olivieri et al. | | |
| 11,645,630 B2 | 5/2023 | Nelson et al. | | |
| 12,216,692 B1 * | 2/2025 | Rogynskyy | .......... | G06N 3/0475 |
| 2009/0112623 A1 * | 4/2009 | Schoenberg | .......... | G06Q 10/02 |
| | | | | 705/2 |
| 2009/0138317 A1 * | 5/2009 | Schoenberg | .......... | H04L 67/562 |
| | | | | 705/2 |
| 2017/0060917 A1 * | 3/2017 | Marsh | ................ | H04L 65/1069 |
| 2018/0089880 A1 | 3/2018 | Garrido et al. | | |
| 2020/0403818 A1 | 12/2020 | Daredia et al. | | |

| | | | | |
|---|---|---|---|---|
| 2021/0258424 A1 | 8/2021 | Brown et al. | | |
| 2021/0266402 A1 | 8/2021 | Nagar et al. | | |
| 2022/0107953 A1 | 4/2022 | Goldstein et al. | | |
| 2022/0132090 A1 | 4/2022 | Deole et al. | | |
| 2022/0391591 A1 | 12/2022 | Ronen et al. | | |
| 2023/0004713 A1 | 1/2023 | Broussard et al. | | |
| 2023/0092334 A1 | 3/2023 | Vendrow | | |
| 2023/0115098 A1 | 4/2023 | Miller et al. | | |
| 2023/0117301 A1 | 4/2023 | Olivieri et al. | | |
| 2023/0394854 A1 * | 12/2023 | Polavaram | ............. | G06V 20/41 |
| 2024/0176960 A1 * | 5/2024 | Maurer | ................. | G06F 16/345 |
| 2025/0045313 A1 | 2/2025 | Rogynskyy et al. | | |
| 2025/0063140 A1 * | 2/2025 | Grillo | ..................... | G06F 40/30 |
| 2025/0217781 A1 * | 7/2025 | Leaman | ............. | G06Q 30/0201 |

OTHER PUBLICATIONS

Zoom, "Enabling Zoom IQ Meeting Summary," Zoom, Jul. 24, 2023, 3 pages, Retrieved from the Internet: URL: https://support.zoom.us/hc/en-us/articles/15088797434893-Enabling-Zoom-IQ-Meeting-Summary.

Notice of Allowance for U.S. Appl. No. 18/470,929 mailed on Jul. 31, 2025, 11 pages.

Notice of Allowance for U.S. Appl. No. 18/470,929, mailed Oct. 10, 2025, 9 pages.

* cited by examiner

Library

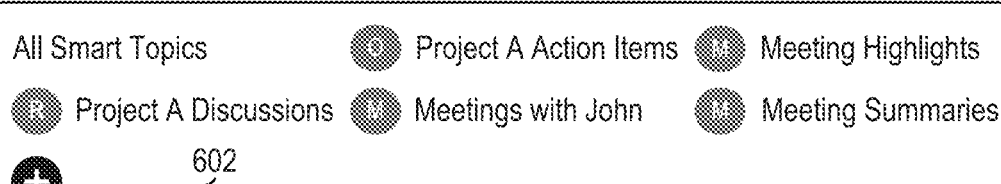

All Smart Topics    Project A Action Items    Meeting Highlights

Project A Discussions    Meetings with John    Meeting Summaries

602

07/17/23 03:50 PM
The transcript is conversation between two colleagues discussing their project, Project A, and the challenges they are facing. They discuss the need to focus on their project and avoid distractions, especially with the upcoming launch. They discuss their goas and things that...

Project A – Brand Discussion                    June 21ˢᵗ 10:23 AM
The transcript is a conversation between various team members discussing the development and launch of Product A. Anna, who leads the production team, introduces herself and her colleagues. Jessica and John, who are working n Project A, explain that the product uses artificial intelligence to...

Allison + Project A                    June 21ˢᵗ 10:54 AM
The transcript is a conversation between two individuals, Allison and Amir, discussing the use of a software called Project A. Amir is the lead on Raven and is seeking feedback from Allison, a user of the software. They discuss the features of Project A, including a new feature called Highlights which allows users to mark...

    

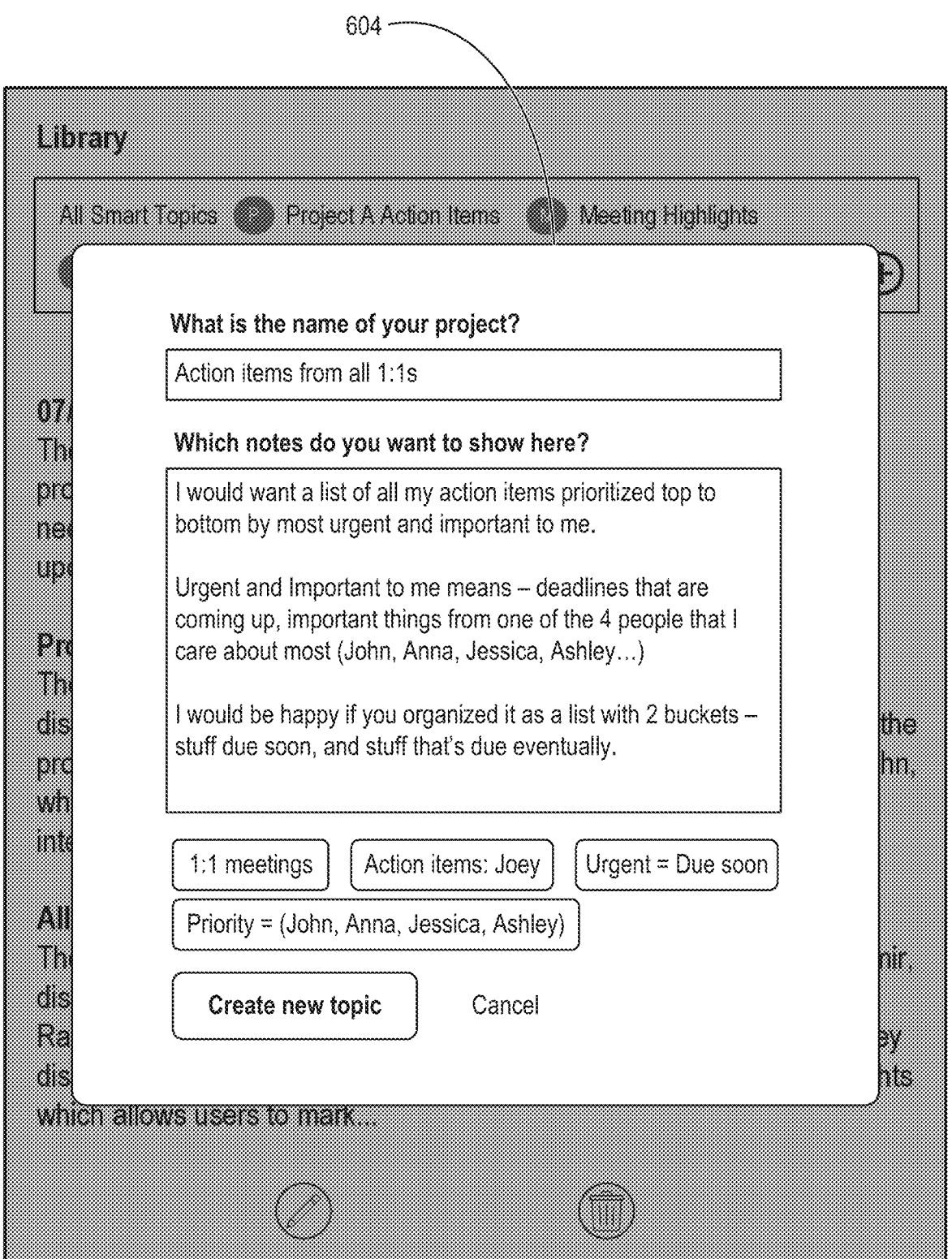

What is the name of your project?

Action items from all 1:1s

Which notes do you want to show here?

I would want a list of all my action items prioritized top to bottom by most urgent and important to me.

Urgent and Important to me means – deadlines that are coming up, important things from one of the 4 people that I care about most (John, Anna, Jessica, Ashley...)

I would be happy if you organized it as a list with 2 buckets – stuff due soon, and stuff that's due eventually.

| 1:1 meetings | Action items: Joey | Urgent = Due soon |

Priority = (John, Anna, Jessica, Ashley)

Create new topic     Cancel

You might enjoy this Smart Topic:

Manager 1:1s
Summaries of 1:1 meetings with manager, Betsy.

Generate Smart Topic          Cancel

Library

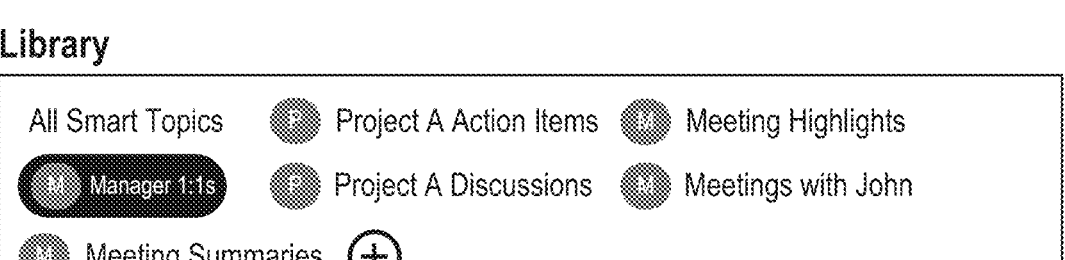

All Smart Topics    Project A Action Items    Meeting Highlights

Manager 1:1s    Project A Discussions    Meetings with John

Meeting Summaries   ⊕

June 20, 2023, 8:30 AM

Discussed the completion of Phase 1 next week and how to reward the team for a job well done. Also made some plans for who should be include in Phase 2 planning to meet the deadline.

June 13, 2023, 11:00AM

Discussed how well the team performed during the first week of Project A and how things are going well. Discussed what some of the next steps will be after the team completes Phase 1.

June 6, 2023, 1:00 PM

Discussed the goals and objectives of Project A and how to achieve these goals. Also, discussed who should be assigned to certain aspects of the project and what their schedules look like during the projected timeframe of Project A.

704

       

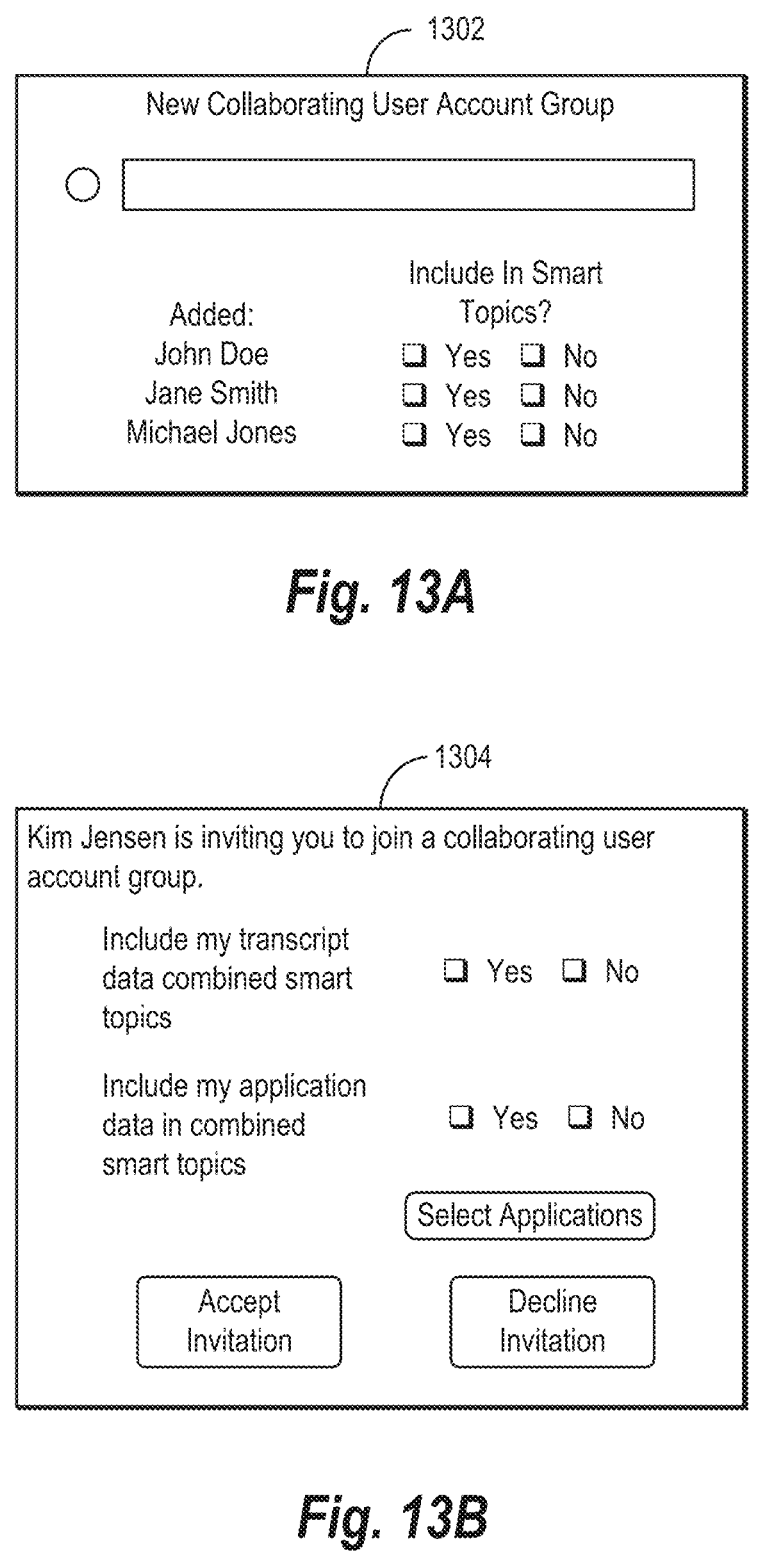

New Collaborating User Account Group

○ [                                    ]

Include In Smart
Added:       Topics?
John Doe     ❑ Yes  ❑ No
Jane Smith    ❑ Yes  ❑ No
Michael Jones  ❑ Yes  ❑ No

Kim Jensen is inviting you to join a collaborating user
account group.

Include my transcript
data combined smart    ❑ Yes  ❑ No
topics

Include my application
data in combined    ❑ Yes  ❑ No
smart topics

[ Select Applications ]

[ Accept
Invitation ]      [ Decline
Invitation ]

*Fig. 13B*

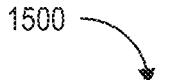
1500
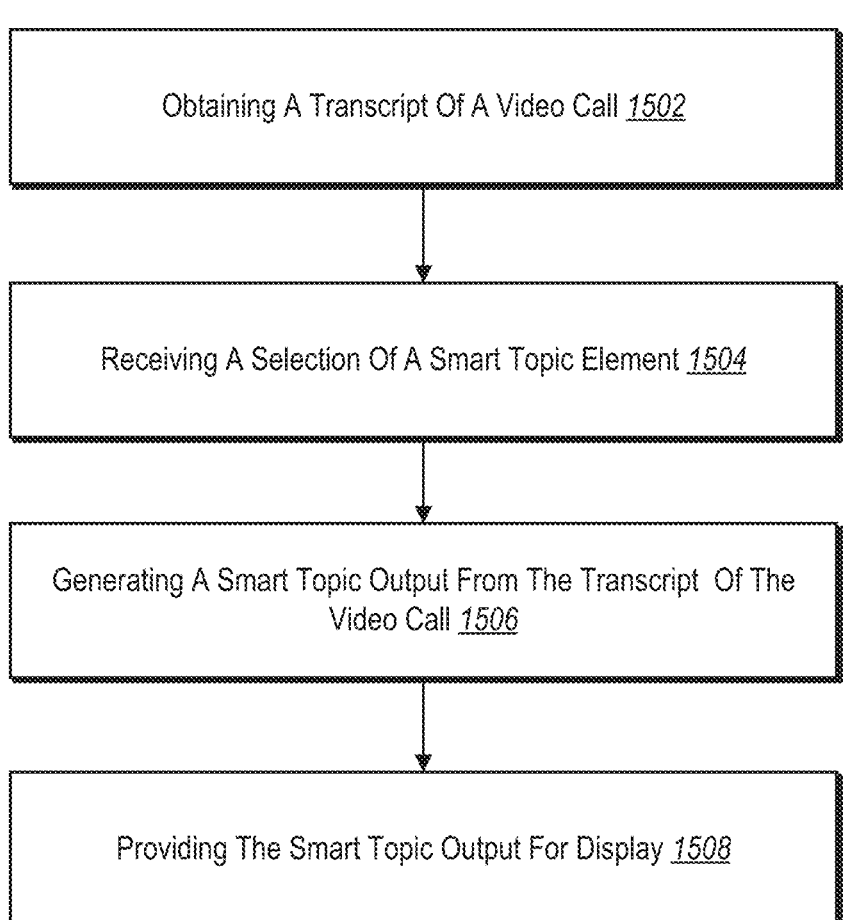
Obtaining A Transcript Of A Video Call *1502*
Receiving A Selection Of A Smart Topic Element *1504*
Generating A Smart Topic Output From The Transcript Of The Video Call *1506*
Providing The Smart Topic Output For Display *1508*
*Fig. 15*

1600

Determining A Collaboration User Account Group *1602*

Obtaining A First Transcript From A First Video Call *1604*

Obtaining A Second Transcript From A Second Video Call *1606*

Receiving A Selection Of A Smart Topic Element Corresponding To A Smart Topic *1608*

Generating A Combined Smart Topic Output *1610*

1800

Content Management System
*1802*

Network
*1804*

User Client Device *1806*

GENERATING SMART TOPICS FOR VIDEO CALLS USING A LARGE LANGUAGE MODEL AND A CONTEXT TRANSFORMER ENGINE

RELATED APPLICATIONS

This application claims priority to and the benefit of U.S. Provisional Patent Application No. 63/519,437, filed on Aug. 14, 2023, and titled "GENERATING SMART TOPICS FOR VIDEO CALLS USING A LARGE LANGUAGE MODEL AND A CONTEXT TRANSFORMER ENGINE," which is hereby incorporated herein by reference in its entirety.

BACKGROUND

Recent years have seen significant improvements in the quality and capabilities of video calling systems, which has resulted in an increase in the use of transcription systems that transcribe digital audio into text. For example, many conventional systems utilize natural language processing or other language processing systems to generate transcripts from video calls and/or audio recordings. Although existing systems can generate transcripts, many of these existing systems exhibit a number of technical deficiencies with regard to contextual data surrounding video calls and their corresponding transcripts, as well as generating actionable data across the many video/audio transcripts generated and stored over time.

As just suggested, many conventional systems are inaccurate. In particular, while some conventional systems can generate transcripts from video calls, many such systems inaccurately identify (or cannot identify) related portions of video transcripts, either for a single video call or across multiple video calls. Even with advances in natural language capabilities, many existing systems identify irrelevant portions and/or fail to identify relevant portions that either use different vernacular referring to the same topic or that include disjointed conversations with many deviations from the topic. Beyond struggling to identify topic-specific portions of video transcripts, some conventional systems further struggle to identify (or are incapable of identifying) digital content outside of a video transcript that corresponds to a topic in the transcript. Indeed, the limitations of natural-language-based systems result not only in flawed processing of video transcripts but also in inaccurate downstream functions that rely on video transcript processing, such as topic-based content searching.

Due at least in part to their inaccuracies, conventional systems are also navigationally inefficient. Specifically, many existing systems provide inefficient user interfaces that require excessive user interactions to find desired data and/or functionality, such as specific excerpts from transcripts. Indeed, because some existing systems produce inaccurate results for topic-specific portions of video transcripts, these systems also require many navigational and/or search inputs to locate additional or missing portions of a transcript that are related to a particular topic. On top of the excessive navigational input for searching transcripts, many conventional systems often require separate interfaces and/or applications to identify and aggregate related subject matter across multiple transcripts and/or from other content items stored in network locations not associated with the video call (but related on a topic and/or user-account basis). For example, conventional systems often require one interface or application for viewing and/or searching transcripts, another for aggregating transcript data (e.g., copying the transcript data), and yet another interface for searching and locating additional content items relating to the transcript. Accordingly, conventional systems are inefficient and require excessive navigational input that could otherwise be reduced or eliminated with more efficient interfaces.

BRIEF SUMMARY

This disclosure describes one or more embodiments of systems, methods, and non-transitory computer-readable storage media that provide benefits and/or solve one or more of the foregoing and other problems in the art. For instance, the disclosed systems generate a smart topic from one or more transcripts of video calls that relate to a label or category of subject matter within the transcripts or to an output related to the transcripts. In some embodiments, the disclosed systems generate a smart topic that is an actionable, standalone content item by accessing data (e.g., content items or transcripts) from a content management system and utilizing a smart topic agent, a context transformer engine, and/or a large language model (LLM) to generate specific outputs. In one or more embodiments, the disclosed systems provide a smart topic interface that can receive text input to generate smart topics and provide smart topic output, such as action items, summaries, and content items related to the subject matter identified in one or more transcripts. In some cases, the disclosed systems aggregate transcripts from multiple client devices participating in different video calls and generate a smart topic based on subject matter found across the multiple transcripts. Embodiments of the present disclosure provide benefits and/or solve one or more of the foregoing or other problems in the art with systems, non-transitory computer-readable media, and methods for generating a smart topic from a transcript.

BRIEF DESCRIPTION OF THE DRAWINGS

The detailed description provides one or more embodiments with additional specificity and detail through the use of the accompanying drawings, as briefly described below.

FIGS. 6A-6C illustrate an example of generating smart topic output based on a text input of a prompt in accordance with one or more embodiments.

FIGS. 7A-7B illustrate an example of the smart topic generation system suggesting a smart topic in accordance with one or more embodiments.

FIGS. 13A-13B illustrate and example diagram of the smart topic generation system receiving indications about sharing data from user accounts of a collaborating user account group when generating a combined smart topic in accordance with one or more embodiments.

FIG. 15 illustrates a flowchart of a series of acts for generating a smart topic in accordance with one or more embodiments.

DETAILED DESCRIPTION

Figure 1:
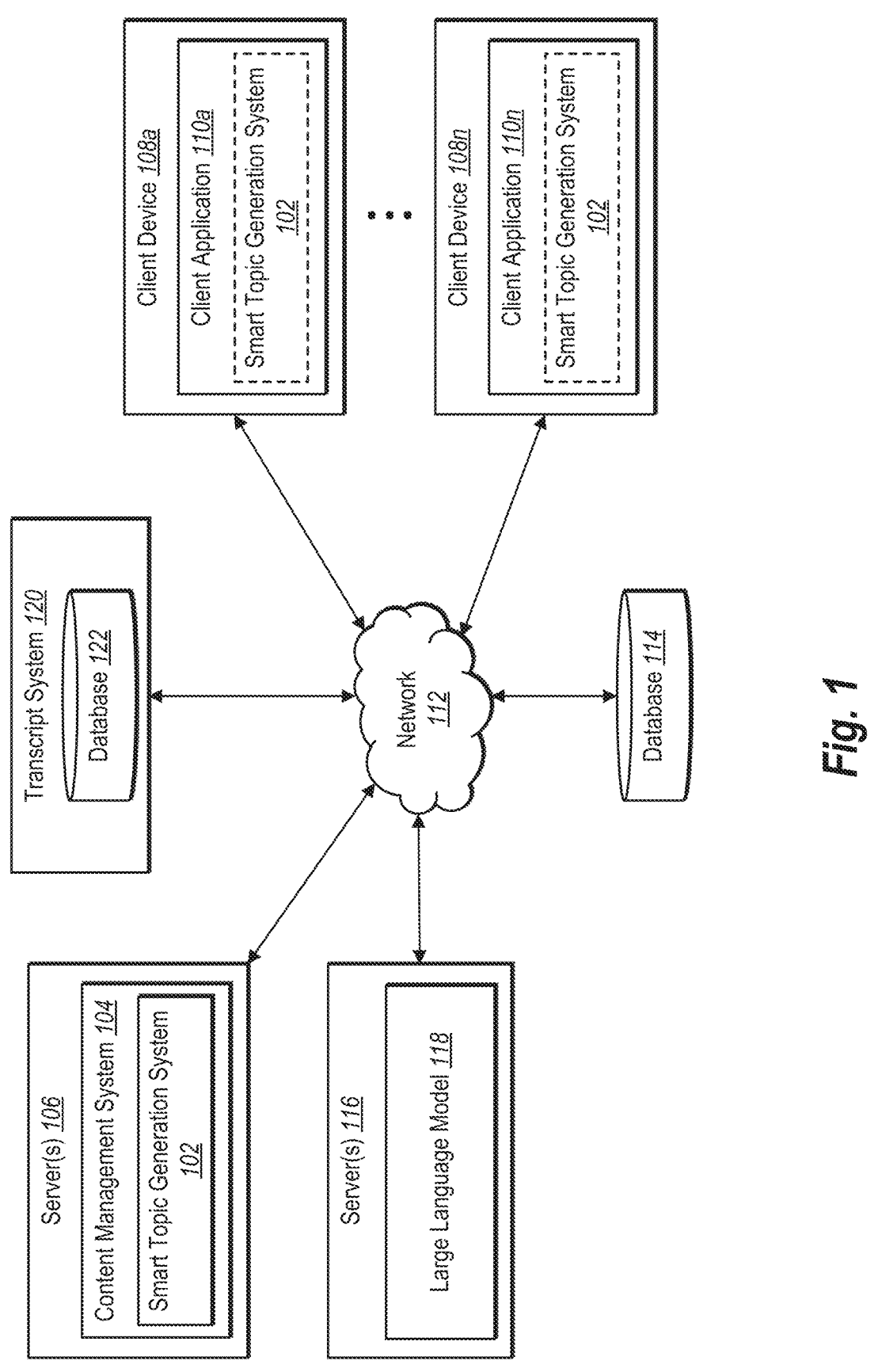
FIG. 1 illustrates a diagram of an environment in which the smart topic generation system can operate in accordance with one or more embodiments.

This disclosure describes one or more embodiments of a smart topic generation system that intelligently generates (and executes operations based on) smart topics related to a video call. In particular, the smart topic generation system provides specialized, intelligent (and sometimes predictive) tools for devices to interact with video call content (and related content items) on a per-use-case basis (e.g., where each smart topic corresponds to and executes a specific process or workflow) to quickly and efficiently implement automated processes and/or generate certain outputs from video call data, especially in scenarios of often repeated or frequent outputs used across many video calls. Specifically, the smart topic generation system generates a smart topic related to a label or category of subject matter within one or more video call transcripts and further generates smart topic outputs relating to the smart topic. For example, the smart topic generation system utilizes a large language model (LLM), a smart topic agent, and/or a context transformer engine to generate a smart topic as an actionable, standalone data item (e.g., a content item) that can access data stored in a content management system and can prompt machine learning models (e.g., LLMs) to generate specific outputs. Through this multi-modal approach, the smart topic generation system can generate a variety of intelligent smart topics that can include, among other things, generating action items based on discussions found in one or more video call transcripts, summarizing a single video call, and summarizing multiple video calls related to certain subject matter (or involving one or more particular user accounts).

As just mentioned, the smart topic generation system generates a smart topic for a video call. For example, in some cases, the smart topic generation system generates a smart topic automatically (e.g., without user interaction for prompting generation) based on analyzing data from content items such as video call transcripts. Specifically, the smart topic generation system can generate a smart topic by analyzing video transcripts and/or other content items, along with an activity history associated with a user account, to predict an action (or a series of actions) that a client device will perform for the user account in relation to the video transcripts and/or other content items. In one or more embodiments, the smart topic generation system generates a smart topic automatically (e.g., without user interaction with a client device) based on identifying related subject matter in one or more transcripts. In some cases, the smart topic generation system generates a smart topic based on receiving input from a client device. In particular, the smart topic generation system can receive input from a client device indicating subject matter about which to generate a smart topic. For example, the smart topic generation system receives a selection of a smart topic element within a smart topic interface (or smart topic interface element) that indicates a smart topic to generate from one or more transcripts. As another example, the smart topic generation system receives text input from a client device comprising actions or prompts for a large language model to generate a specific output (e.g., an action item) related to subject matter within one or more transcripts of one or more video calls.

In one or more embodiments, the smart topic generation system obtains additional data from which to generate a smart topic, aside from video transcripts. In particular, the smart topic generation system can obtain application data from a computer application executed by a client device. For example, the smart topic generation system receives application data from email applications, transaction data applications, messaging applications, project management applications, and/or contact applications. The smart topic generation system can further use the application data to generate a smart topic by predicting client device actions for topics or subject matter associated with the application data (e.g., content items) from the various computer applications, along with those from video call transcripts. In some cases, the smart topic generation system provides the application data as part of a smart topic output presented within the smart topic interface on the client device.

To generate a smart topic output, in some cases, the smart topic generation system utilizes a smart topic agent, a context transformer engine, and a large language model. For example, the smart topic generation system generates—from topics or subject matter (or other data) extracted from video call transcripts, from content items associated with a user account and/or other computer applications, from a knowledge graph associated with the user account, and/or from an activity history of the user account—a prompt for a large language model to generate an objective for a client device (e.g., as a prediction for what the client device would do with the topics and other data). The smart topic generation system can further utilize a context transformer engine to process the objective and break the objective down into individual processes or actions performable by a client device and/or other computer systems to accomplish the objective. The context transformer engine can further generate (and spin up resources for) smart topic agents that each execute respective processes that make up the objective. The smart topic generation system further compiles or composites the respective outputs from the processes of the smart topic agents into a smart topic output that is displayable on a client device.

Further, the smart topic generation system can suggest content items related to a smart topic. In one or more embodiments, the smart topic generation system identifies that content in a content item stored for a user account of a content management system is related to the smart topic and suggests the content item with the smart topic within a smart topic interface presented on the client device. In some cases, the smart topic generation system suggests one or more content items during a video call. For example, the smart topic generation system identifies (from a video call transcript generated on the fly for a video call) one or more suggested content items, such as visual aids, documents, and/or application data relevant to a particular topic discussed during the video call and presents the suggested content item(s) in a smart topic interface element during the video call.

In one or more embodiments, the smart topic generation system generates combined smart topics from video calls associated with users of a collaborating user account group that are collaborating on one or more content items. For example, the smart topic generation system obtains transcripts corresponding to multiple video calls from client devices associated with user accounts of the collaborating user account group and generates a combined smart topic from the transcripts. In some embodiments, the smart topic generation system also uses application data when generating a smart topic. For example, the smart topic generation system obtains application data from other computer applications (e.g., applications other than a video call application) executed by a client device associated with a user account of the collaborating user account group and utilizes the application data along with the transcript data to generate a combined smart topic.

Additionally, in one or more embodiments, the smart topic generation system receives indications from client devices of the collaborating user account group that indicate whether or not to share transcript data or other (non-video-call) application data when generating a combined smart topic. For example, the smart topic generation system can receive a selection of an option within the smart topic interface that indicates whether or not to include data (e.g., transcript data or application data) associated with a user account of the collaborating user account group. In some embodiments, an invitation to join a collaborating user account group includes a selectable option indicating whether or not to share user data. In other embodiments, the smart topic generation system receives an indication regarding whether or not to share data when a client device joins a video call.

Further, in one or more embodiments, the smart topic generation system can collect transcript data from client devices that participate in a video call that are not part of a collaborating user account group. In particular, the smart topic generation system can provide an option to include transcript data from a client device of a video call participant that is associated with a user account not part of the collaborating user account group (e.g., when the client device joins the video call). In some cases, the smart topic generation system provides an option to decline sharing transcript data to client devices that are associated with the collaborating user account group. In other cases, the smart topic generation system provides the option to the client device that is not associated with the collaborating user account group.

As suggested above, embodiments of the smart topic generation system can provide a variety of technical advantages over conventional systems. For example, the smart topic generation system provides improved accuracy and efficiency in relation to generating and executing processes for smart topics. Regarding accuracy, as opposed to existing systems that rely on natural language techniques to determine or identify portions of a transcript relating to a certain topic, the smart topic generation system utilizes a context transformer engine, a large language model, and a smart topic agent to extract topic data and generate smart topics for performing processes in relation to video call transcripts (and other content items). Indeed, the smart topic generation system exhibits far better accuracy and coherency across video transcripts, even in cases with varying nomenclature and divergent conversations that might trip up existing natural language models. Using its architectural components, the smart topic generation system can further improve accuracy in identifying and surfacing content items relevant to certain video transcripts (or smart topics).

Due at least in part to improving accuracy, the smart topic generation system also improves navigational efficiency relative to conventional systems. For example, unlike many conventional systems that provide inefficient interfaces which require scrolling or searching through full length transcripts to access certain subject matter or topics, the smart topic generation system identifies and parses out related subject matter to generate a smart topic. By utilizing a context transformer engine and a smart topic agent to intelligently identify and parse out information for a large language model to process, the smart topic generation system efficiently generates smart topics summarizing subject matter, generates action items, and provides single-click interface elements for executing processes in relation to the smart topics. Indeed, by removing the need to search or scroll through multiple transcripts and to further use separate applications for executing additional processes from transcript data, the smart topic generation system provides efficient user interfaces (e.g., a smart topic interface) that require far fewer interactions to determine, and perform processes for, various smart topics.

Along the lines of requiring fewer interactions through providing more efficient user interfaces, the smart topic generation system can identify and utilizes a smart topic interface that displays smart topic output from transcripts that relates to subject matter for a selected smart topic. In addition, because the smart topic generation system can obtain (or generate) transcripts as a client device participates in a video call, the smart topic generation system can continuously update the smart topic output. In this way, the smart topic interface displays updated transcript data (and application data) related to the smart topic without requiring user interaction. Moreover, the smart topic generation system can identify related subject matter over time and through different meetings (and/or across user accounts) and suggest smart topics, content items, and/or application data to the user (e.g., through a pop-up interface), requiring minimal interface interactions to generate and display multiple types of output.

Moreover, in some embodiments, the smart topic generation system improves flexibility relative to conventional systems. Unlike conventional systems that require accurate input to identify subject matter, the smart topic generation system can identify subject matter in transcripts with minimal input or no input. The smart topic generation engine utilizes a context transformer engine and a smart topic agent that efficiently analyzes transcript data and parses out specific segments, then communicate those segments to a large language model to target particular smart topic-specific outputs. Indeed, while conventional systems can only find subject matter related to transcript data in a given transcript, the smart topic generation system can not only identify related subject matter through time and across multiple transcripts and user accounts but can also utilize related application data to generate a smart topic along with suggesting related content items.

In some embodiments, the smart topic generation system utilizes a unique architecture that includes a large language model, a context transformer engine, and a smart topic agent to dynamically generate a smart topic output. In particular, the smart topic generation system can utilize its architecture to summarize subject matter across multiple transcripts or parse out specific action items from discussions between participants of a video call and/or from different content items stored in databases of a content management system. Indeed, the smart topic generation system can intelligently identify subject matter and topics that comprise related subject matter and present them as suggested smart topics.

As illustrated by the foregoing discussion, the present disclosure utilizes a variety of terms to describe the features and advantages of the smart topic generation system. Additional detail is now provided regarding the meaning of such terms. For example, as used herein, the term "transcript" refers to a digitized text version of data captured during a phone call or a video call. In particular, a transcript can include the words spoken by each participant in the discussion, phone call, or video call. To illustrate, a transcript of a video call can be a digital document that comprises the text and metadata associated with the video call.

Furthermore, as used herein, the term "large language model" refers to a machine learning model trained to perform computer tasks to generate or identify content items in response to trigger events (e.g., user interactions, such as text queries and button selections). In particular, a large language model can be a neural network (e.g., a deep neural network or a transformer neural network) with many parameters trained on large quantities of data (e.g., unlabeled text) using a particular learning technique (e.g., self-supervised learning). For example, a large language model can include parameters trained to generate outputs (e.g., smart topic outputs) based on prompts and/or to identify content items based on various contextual data, including graph information from a knowledge graph and/or historical user account behavior. In some cases, a large language model comprises a GPT model such as, but not limited to, ChatGPT.

Relatedly, as used herein, the term "machine learning model" refers to a computer algorithm or a collection of computer algorithms that automatically improve for a particular task through iterative outputs or predictions based on the use of data. For example, a machine learning model can utilize one or more learning techniques to improve accuracy and/or effectiveness. Example machine learning models include various types of neural networks, decision trees, support vector machines, linear regression models, and Bayesian networks. In some embodiments, the morphing interface system utilizes a large language machine-learning model in the form of a neural network.

Relatedly, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., content items or smart topic outputs) based on a plurality of inputs provided to the neural network. In some cases, a neural network refers to an algorithm (or set of algorithms) that implements deep learning techniques to model high-level abstractions in data. A neural network can include various layers, such as an input layer, one or more hidden layers, and an output layer that each perform tasks for processing data. For example, a neural network can include a deep neural network, a convolutional neural network, a transformer neural network, a recurrent neural network (e.g., an LSTM), a graph neural network, or a generative adversarial neural network. Upon training, such a neural network may become a large language model.

Also, as used herein, the term "smart topic output" refers to the information, data, and/or transcript portions presented to on a client device representing or depicting the subject matter of, or generated in relation to, a smart topic. In particular, a smart topic output can include displayable information or content that a context engine, smart topic agent, and/or large language model identify or generate for a smart topic (e.g., from one or more video transcripts, application data, and/or content items). In some cases, smart topic output can be presented in a smart topic interface on a client device.

Additionally, as used herein, the term "smart topic agent" refers to a system or a computer code segment that, when executed, processes or breaks down information to generate a smart topic output. In particular, a smart topic agent can be a script that manages and aggregates data (e.g., video call transcripts), identifies subject matter or topics within data, executes programs, or sends reports. As an example, a smart topic agent can refer to a script that (by running in a loop) breaks down payload data to submit to a large language model. To illustrate, a smart topic agent can include a multitude of code segments that are each executable to perform a specified step and can work together to prepare data to submit to a large language model. A smart topic agent can communicate with an LLM to generate executable code to perform a particular task, can generate LLM queries or prompts to target a particular output, can access data within a knowledge graph or an organizational chart, and/or can interface with other smart topic agents to generate smart-topic-specific outputs.

Further, as used herein, the term "context transformer engine" refers to a grouping of applications and/or machine learning models that are used to break down components into their context sources. In particular, a "context transformer engine" can include one or more computer applications and/or machine learning models for software/network orchestration that break down components of a multi-order text query and indicate various contextual data sources. For example, a context transformer engine can break down components of a client input regarding a smart topic and indicate contextual data sources for the smart topic (e.g., video call transcripts). The context transformer engine can also break down a multi-order objective into individual processes or tasks performable by a computing device to ultimately accomplish the multi-order objective. In some cases, a context transformer engine can include a context transformer engine as described in U.S. application Ser. No. 18/309,496, filed Apr. 28, 2023, entitled GENERATING MULTI-ORDER TEXT QUERY RESULTS UTILIZING A CONTEXT ORCHESTRATION ENGINE (hereinafter "application Ser. No. 18/309,496"), the contents of which are herein incorporated by reference in their entirety.

Moreover, as used herein, the term "content item" refers to a digital object or a digital file that includes information interpretable by a computing device (e.g., a client device) to present information to a user. A content item can include a folder or a file such as a digital text file, a digital image file, a digital audio file, a webpage, a website, a digital video file, a web file, a link, a digital document file, or some other type of file or digital object. A content item can have a particular file type or file format, which may differ for different types of digital content items (e.g., digital documents. digital images, digital videos, or digital audio files). In some cases, a content item can refer to a remotely stored (e.g., cloud-based) item or a link (e.g., a link to a cloud-based item or a web-based content item) and/or a content clip that indicates (or links) a discrete selection or segmented portion of content from a webpage or some other content item or source. A content item can be editable or otherwise modifiable and can also be sharable from one user account (or client device) to another. In some cases, a content item is modifiable by multiple user accounts (or client devices) simultaneously and/or at different times.

In addition, as used herein, the term "collaborating user account group" refers to an account or group that allows for multiple users to collaborate together. In particular, "collaborating user account group" refers to a type of account or group within a content management system that allows for multiple users to collaborate on one or more content items within the content management system. For example, a collaborating user account group can include user accounts that share information and data related to the one or more content items and include sharing transcript data and application data from which to generate combined smart topics.

As used herein, the term "application data" refers to data obtained from or associated with a computer application (e.g., an application other than a video call application). In particular, application data refers to content items or other data extracted or gathered from an application executed on (or associated with) a client device that provides data that is associated with the application, client device interactions with the application, or other data stored within the application. For example, application data can include email data from an email application (e.g., email text), call data from a call application (e.g., call transcripts or call logs), contact information data from a contact application (e.g., contact information), or transaction information from a transaction data application (e.g., sales contacts, contact logs, or client interactions).

Additional details regarding the smart topic generation system will now be provided with reference to the figures. For example, FIG. 1 illustrates a block diagram of a system environment for implementing a smart topic generation system 102 in accordance with one or more embodiments. An overview of the smart topic generation system 102 is described in relation to FIG. 1. Thereafter, a more detailed description of the components and processes of the smart topic generation system 102 is provided in relation to the subsequent figures.

As shown, the environment includes server(s) 106, server (s) 116, which store or house a large language model 118, database 114, client device(s) 108a-108n, and transcript system 120. Each of the components of the environment can communicate via network 112, and network 112 may be any suitable network over which computing devices can communicate. Example networks are discussed in more detail below in relation to FIGS. 17-18.

As mentioned above, the example environment includes client device(s) 108a-108n. The client device(s) 108a-108n can be one of a variety of computing devices, including a smartphone, a tablet, a smart television, a desktop computer, a laptop computer, a virtual reality device, an augmented reality device, or another computing device as described in relation to FIGS. 17-18. The client device(s) 108a-108n can communicate with the server(s) 106 via network 112. For example, the client device(s) 108a-108n can receive user input from a user interacting with client device(s) 108a-108n (e.g., via the client application(s) 110a-110n) to, for instance, participate in a video call, select user interface elements to interact with the content management system or to select a smart topic, or to input a text query to generate a smart topic. In addition, the smart topic generation system 102 or the server(s) 106 can receive information relating to various interactions with content items and/or user interface elements based on the input received by the client device(s) 108a-108n.

As shown, the client device(s) 108a-108n can include a client application 110a-110n. In particular, the client application 110a-110n may be a web application, a native application installed on the client device(s) 108a-108n (e.g., a mobile application, a desktop application, etc.), or a cloud-based application where all or part of the functionality is performed by the server(s) 106. Based on instructions from the client application(s) 110a-110n, the client device(s) 108a-108n can present or display information, including a user interface for interacting with (or collaborating regarding) generating smart topics. Using the client application, the client device(s) 108a-108n can perform (or request to perform) various operations, such as generating a smart topic and/or inputting text comprising actions or prompts to generate a specific output.

As illustrated in FIG. 1, the example environment also includes the server(s) 106. The server(s) 106 may generate, track, store, process, receive, and transmit electronic data, such as smart topics, results, actions, determinations, responses, computer code specific to smart topics, interactions with interface elements, and/or interactions between user accounts or client devices. For example, the server(s) 106 may receive an indication from the client device(s) 108a-108n of a user interaction selecting a smart topic or inputting text comprising actions or prompts to generate a specific output based on a smart topic. In addition, the server(s) 106 can transmit data to the client device(s) 108a-108n in the form of a smart topic. Indeed, the server(s) 106 can communicate with the client device(s) 108a-108n to send and/or receive data via network 112. In some implementations, the server(s) 106 comprise(s) a distributed server where the server(s) 106 include(s) a number of server devices distributed across the network 112 and located in different physical locations. The server(s) 106 can comprise one or more content servers, application servers, container orchestration servers, communication servers, web-hosting servers, machine learning servers, and other types of servers.

As shown in FIG. 1, the server(s) 106 can also include the smart topic generation system 102 as part of the content management system 104. The content management system 104 can communicate with the client device(s) 108a-108n to perform various functions associated with the client application(s) 110a-110n, such as managing user accounts, defining smart topics, and/or identifying content items. Indeed, content management system 104 can include a network-based smart cloud storage system to manage, store, and maintain content items and related data across numerous user accounts. In some embodiments, the smart topic generation system 102 and/or the content management system 104 utilize the database 114 to store and access information such as content items, video call transcript data, smart topic data, and other information.

As further illustrated, the environment includes the server (s) 116 that hosts the large language model 118. In particular, the large language model 118 communicates with the server (s) 106, the client device(s) 108*a*-108*n*, and/or the database 114. For example, the smart topic generation system 102 provides domain-specific language segments to the large language model 118, where the domain-specific language segments indicate various video call transcript data for generating results for various subcomponents. Indeed, the large language model 118 can include a machine learning model powered by neural networks or other machine learning architectures for generating responses to text queries. For example, the large language model 118 can refer to a ChatGPT model or a large language model maintained by the content management system 104 that generates computer-executable code segments for generating smart topics.

Moreover, as illustrated, the environment includes the transcript system 120. In particular, the transcript system 120 generates, provides, and/or distributes video call transcripts to other systems, devices, or entities. For example, the transcript system 120 communicates with the server(s) 106 and/or the client device(s) 108*a*-108*n* to provide video call transcripts in order to generate smart topics. In some cases, the transcript system 120 uses a database 122 to store or maintain video call transcripts for distribution to target entities.

Although FIG. 1 depicts the smart topic generation system 102 located on the server(s) 106, in some implementations, the smart topic generation system 102 may be implemented by (e.g., located entirely or in part on) one or more other components of the environment. For example, the smart topic generation system 102 may be implemented as part of client device(s) 108*a*-108*n* and/or a third-party system. As another example, the client device(s) 108*a*-108*n* and/or a third-party system can download all or part of the smart topic generation system 102 for implementation independent of, or together with, the server(s) 106. As a further example, the transcript system 120 may be implemented as part of the smart topic generation system 102.

In some implementations, though not illustrated in FIG. 1, the environment may have a different arrangement of components and/or may have a different number or set of components altogether. For example, the client device(s) 108*a*-108*n* may communicate directly with the smart topic generation system 102, bypassing network 112. The environment may also include one or more third-party systems, each corresponding to a different data source. In addition, the environment can include the database 114 located external to the server(s) 106 (e.g., in communication via the network 112) or located on the server(s) 106 and/or on the client device(s) 108*a*-108*n*. In some cases, the server(s) 106 and/or the client device(s) 108*a*-108*n* can host or house all or part of the large language model 118.

Figure 2:
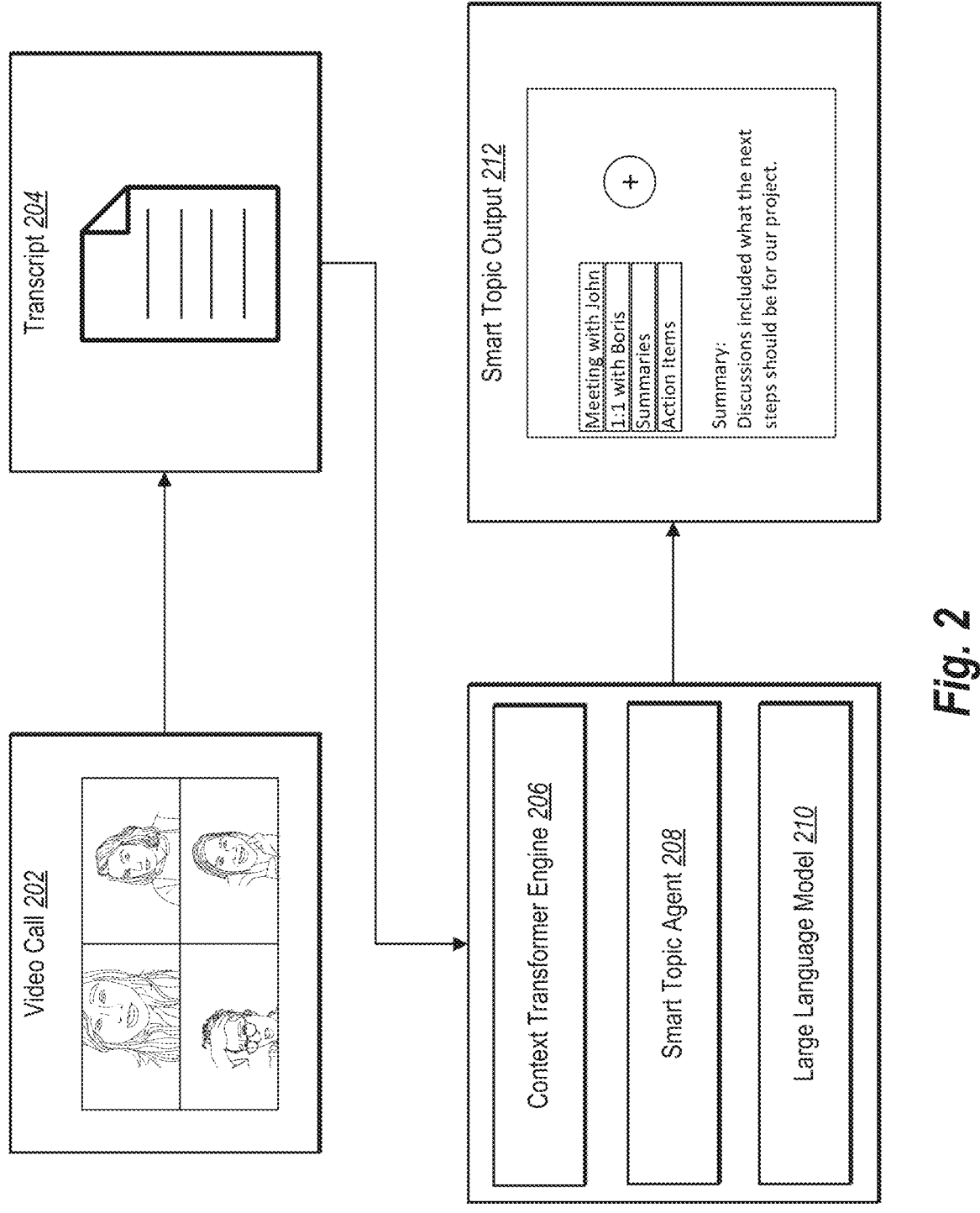
FIG. 2 illustrates an example diagram of an overview of the smart topic generation system generating a smart topic in accordance with one or more embodiments.

As mentioned, the smart topic generation system 102 generates a smart topic from one or more video call transcripts. In particular, the smart topic generation system 102 obtains one or more transcripts from video call data captured from video calls and utilizes a smart topic agent, a large language model, and a context transformer engine to generate smart topic output from the captured data. FIG. 2 illustrates an overview of the smart topic generation system 102, generating a smart topic output in accordance with one or more embodiments. Additional detail regarding the various acts illustrated in FIG. 2 is provided thereafter with reference to subsequent figures.

As illustrated in FIG. 2, the smart topic generation system 102 receives or captures data from a video call 202. In particular, the smart topic generation system 102 captures data from the video call 202 by receiving video and audio data from one or more client devices participating in the video call 202. For example, a video call service can host the video call by combining, at a server device, video streams from each of the client devices into a combined video call stream that can be viewed through a video call interface on each client device participating in the video call.

As further illustrated in FIG. 2, the smart topic generation system 102 can generate or obtain transcript 204. For instance, the smart topic generation system 102 can generate transcript 204 using one or more transcription models and/or can utilize an available online transcription service. For example, utilizes a transcription model to convert audio data from the video call 202 to digitized text. In some cases, the smart topic generation system 102 obtains transcript 204 from a transcript system (e.g., transcript system 120) that generates video call transcripts from video calls.

As mentioned, in other embodiments, the smart topic generation system 102 generates transcript 204. In particular, the smart topic generation system 102 extracts video call data from which to generate transcript 204. For example, the smart topic generation system 102 transcribes audio data (e.g., words and other language components spoken by participants) in a video call into a video call transcript. In some cases, the smart topic generation system 102 identifies when a client device begins a video call (e.g., through the initiation of a video call application or interface) and generates transcript 204 upon initialization of the video call.

As also shown in FIG. 2, the smart topic generation system 102 utilizes a multi-modal approach to analyze the transcript 204. In particular, the smart topic generation system 102 utilizes multiple models to identify or determine smart topics associated with the video call 202 by analyzing the transcript 204 (and/or transcripts from other video calls). As shown, the smart topic generation system 102 utilizes a context transformer engine 206, a smart topic agent 208, and a large language model 210. For example, the smart topic generation system 102 utilizes one or more of these components to determine or predict a smart topic associated with the video call 202. To elaborate, in addition to the transcript 204, the smart topic generation system 102 analyzes data such as a knowledge graph and/or an activity history associated with a user account (and/or co-user accounts related to the user account within the knowledge graph) to determine or predict actions or processes executable on data extracted from the video call 202. Specifically, the smart topic generation system 102 can predict processes a device is likely to perform in relation to the video call 202 based on processes performed for past video calls (of the same user account and/or other user accounts within the content management system 104) using the knowledge graph and/or activity history. In some cases, the smart topic generation system 102 determines topics mentioned in the video call 202 (e.g., by analyzing the transcript 204) and generates predicted processes or actions in relation to the topics. In certain embodiments, a smart topic refers to such predictions of processes or actions performable by a client device in relation to a video call.

Along these lines, as further illustrated in FIG. 2, the smart topic generation system 102 generates a smart topic output 212 for a smart topic (e.g., for a prediction of processes to perform in relation to the video call 202). To generate the smart topic output 212, the smart topic generation system 102 provides the transcript 204 (and/or application data from other computer applications) to the context transformer engine 206, which processes and breaks down the transcript 204. For example, the context transformer engine 206 identifies portions of transcript 204 that correspond to or mention particular subject matter to topics. The context transformer engine 206 can process transcript 204 by breaking transcript 204 into portions or segments that comprise the subject matter associated with or related to a smart topic.

Relatedly, in one or more embodiments, the context transformer engine 206 identifies portions of transcript 204 related to text input from a client device indicating a smart topic. In particular, the smart topic generation system 102 receives text input from a client device that comprises a prompt (e.g., a string of characters processable by a large language model) indicating an objective (e.g., an action, task, or goal) for smart topic output 212. For example, the smart topic generation system 102 utilizes the context transformer engine 206 to process the objective (e.g., to identify content items corresponding to a topic mentioned in the video call 202 or to determine timestamps where a particular topic was mentioned or to identify all video calls where a particular user account mentioned a certain topic) and to identify portions of transcript 204 that relate to the objective and process (e.g., break downs or separate) transcript 204 into portions that relate to the objective.

The context transformer engine 206 can also utilize or work with a smart topic agent 208. In particular, the context transformer engine can generate (and spin up network and computing resources for) smart topic agent 208, which can execute a respective process as a part of completing an objective and in order to generate smart topic output 212. For example, the context transformer engine 206 can utilize (or generate) smart topic agent 208 to identify and parse out information from transcript 204 that relates to an objective related to a smart topic. In some cases, the context transformer engine 206 generates a smart topic agent 208 to complete an objective that is indicated in the text input of a prompt. Indeed, the smart topic agent 208 can be specific to a particular smart topic, predicted processes, or objective relating to the video call 202. Likewise, the context transformer engine 206 can generate other smart topic agents that each correspond to their own smart topic for achieving their respective objectives in relation to the video call 202 (or another video call).

In some embodiments, the context transformer engine 206 includes, or works in conjunction with, one or more models (e.g., a content relevance engine) described in U.S. patent application Ser. No. 18/342,469 entitled GENERATING AND PROVIDING MORPHING ASSISTANT INTERFACES THAT TRANSFORM ACCORDING TO ARTIFICIAL INTELLIGENCE SIGNALS, which is hereby incorporated by reference in its entirety. For example, the smart topic generation system 102 can utilize the knowledge graph and one or more content extraction engines or processes described in U.S. patent application Ser. No. 18/342,469 to determine and surface relevant digital content for user accounts. In further embodiments, the context transformer engine 206 includes, or works in conjunction with, one or more models described in U.S. patent application Ser. No. 18/344,041 entitled GENERATING AND PROVIDING CONTENT STACKS UTILIZING MACHINE-LEARNING MODELS, which is hereby incorporated by reference in its entirety. For example, the smart topic generation system can utilize the stack formulation graph described in U.S. patent application Ser. No. 18/344,041 to identify or indicate relationships between content items and/or user accounts and suggest content items (e.g., with a smart topic).

As previously mentioned, the context transformer engine 206 and the smart topic agent 208 work together with a large language model to generate the smart topic output 212. In particular, the smart topic agent 208 can process data within transcript 204 (e.g., a portion segmented by the context transformer engine 206 and designated as corresponding to a particular smart topic or objective) to generate a query indicating a high-level objective for large language model 210. In turn, the context transformer engine 206 ingests and dissects the query into lower-level queries (which together make up the high-level objective) that are executable by the large language model 210. For example, the smart topic agent 208 can process transcript 204 to identify portions that comprise subject matter related to a smart topic and generate a series of prompts for large language model 210 (e.g., where each prompt relates to portions of transcript 204 indicated by the context transformer engine 206 as corresponding to a particular process or query). The context transformer engine 206 can further refine the portions of transcript 204 to generate other objectives for large language model 210 that work together to generate the desired smart topic output 212. More detail regarding the smart topic generation system 102 utilizing a context transformer engine, a smart topic agent, and a large language model to generate a desired smart topic output will be discussed with respect to FIG. 3.

In one or more embodiments, the smart topic generation system 102 provides the smart topic output 212 within a smart topic interface displayed on a client device. In particular, the smart topic generation system receives indications of user interactions within the smart topic interface and displays the smart topic output accordingly. For example, the smart topic generation system 102 receives indications from the client device to display various smart topic output 212 within the smart topic interface. Displaying various smart topic outputs within the smart topic interface is discussed further with respect to FIGS. 5A-5C.

In one or more embodiments, the smart topic generation system 102 utilizes other data, information, or content in addition to transcript 204 to generate smart topic output 212. In particular, the smart topic generation system 102 obtains application data from a computer application executed by a client device. For example, the smart topic generation system can obtain application data from email applications, transaction data applications, messaging applications, project management applications, and/or contact applications. In some cases, the smart topic generation system 102 uses the application data to generate a smart topic by identifying subject matter in the application data that relates to transcript 204. In other cases, the smart topic generation system 102 uses the application data to generate smart topic output 212 by predicting client device actions for topics or subject matter associated with the application data from the various computer applications, along with those from video call transcripts. In even more cases, the smart topic generation system provides the application data as part of a smart topic output presented within the smart topic interface on the client device. Utilizing application data along with transcript data to generate a smart topic output will be discussed further with respect to FIG. 4.

As mentioned above, in some embodiments, the smart topic generation system 102 generates a smart topic based on receiving text input from a client device. In particular, the smart topic generation system 102 can receive text input in a smart topic interface presented on the client device that indicates information for generating a smart topic. For example, the smart topic generation system 102 can receive text input that indicates the subject matter about which to generate a smart topic. As another example, the smart topic generation system 102 can receive text input that comprises prompts or actions for a specific output (e.g., an action item) related to the subject matter identified within one or more transcripts and, in some cases, application data. Receiving text input from a client device to generate a smart topic will be discussed further with respect to FIGS. 6A-6C.

In one or more embodiments, the smart topic generation system 102 generates smart topic output during a video call. In particular, the smart topic generation system 102 is connected to or associated with a video call interface and identifies when a client device initiates (e.g., starts or joins) a video call and generates smart topic output using transcript data or video call data obtained during the video. For example, the smart topic generation system 102 initiates a smart topic interface element as an overlay on the video call interface from which the smart topic generation system 102 receives indications from the client device during the video call. The smart topic generation system 102 generates a smart topic utilizing video call data corresponding to indications from client devices in a smart topic interface element and will be discussed further with respect to FIGS. 8A-8C. The smart topic generation system 102 can also present suggested content items to the client device through the smart topic interface element, which will be discussed further with respect to FIG. 9.

As also mentioned, in some embodiments, the smart topic generation system 102 generates a smart topic automatically (e.g., without user interaction with a client device). In particular, the smart topic generation system 102 identifies related subject matter in one or more transcripts and, in some cases, application data and generates a suggested smart topic (e.g., based on frequently used smart topics by user accounts of the content management system 104). Moreover, the smart topic generation system 102 can present the suggested smart topic to the client device within the smart topic interface and, upon indication of a user selection of the suggested smart topic, generate smart topic output 212 of the suggested smart topic within the smart topic interface. Generating a suggested smart topic will be discussed further with respect to FIGS. 7A-7B.

In one or more embodiments, the smart topic generation system 102 initiates a smart topic interface element in conjunction with video call 202. In particular, the smart topic generation system 102 detects a video call interface initiating a video call on the client device and providing a smart topic interface element as an overlay on the video call interface. The smart topic generation system 102 can receive indications of client device interactions with the smart topic interface element and generate a smart topic based on the client device interactions. For example, the smart topic generation system 102 can receive an indication of a client device interaction with a highlight option (e.g., an option to highlight various topics mentioned in the video call 202) within the smart topic interface element and generate a smart topic output 212 (e.g., a highlight). The smart topic generation system 102 receiving indications of user interactions with a smart topic interface element and generating a smart topic output will be discussed with respect to FIGS. 8A-8B.

In some embodiments, the smart topic generation system 102 suggests content items corresponding to the smart topic output. In particular, the smart topic generation system 102 identifies that a content item stored for a user account of a content management system is related to the smart topic output 212 and provides the content item in the smart topic interface with the smart topic output 212. For example, the smart topic generation system 102 can provide a selectable option representing the content item in the smart topic interface that, when selected, opens the content item. Providing content items with smart topic output will be discussed further with respect to FIG. 9.

In addition, in one or more embodiments, the smart topic generation system 102 provides content items during a video call. In particular, the smart topic generation system 102 can identify (e.g., from a video call transcript generated during a video call) one or more content items that are related to topics discussed during the video call and presents the content item(s) in a smart topic interface element during the video call. For example, the smart topic generation system 102 can identify from the transcript that topics or subject matter discussed during the video call is relevant or related to visual aids, documents, and/or application data and presents the content item(s) in the smart topic interface element. Identifying related content items and presenting content items in a smart topic interface element will be discussed further with respect to FIG. 10.

Figure 3:
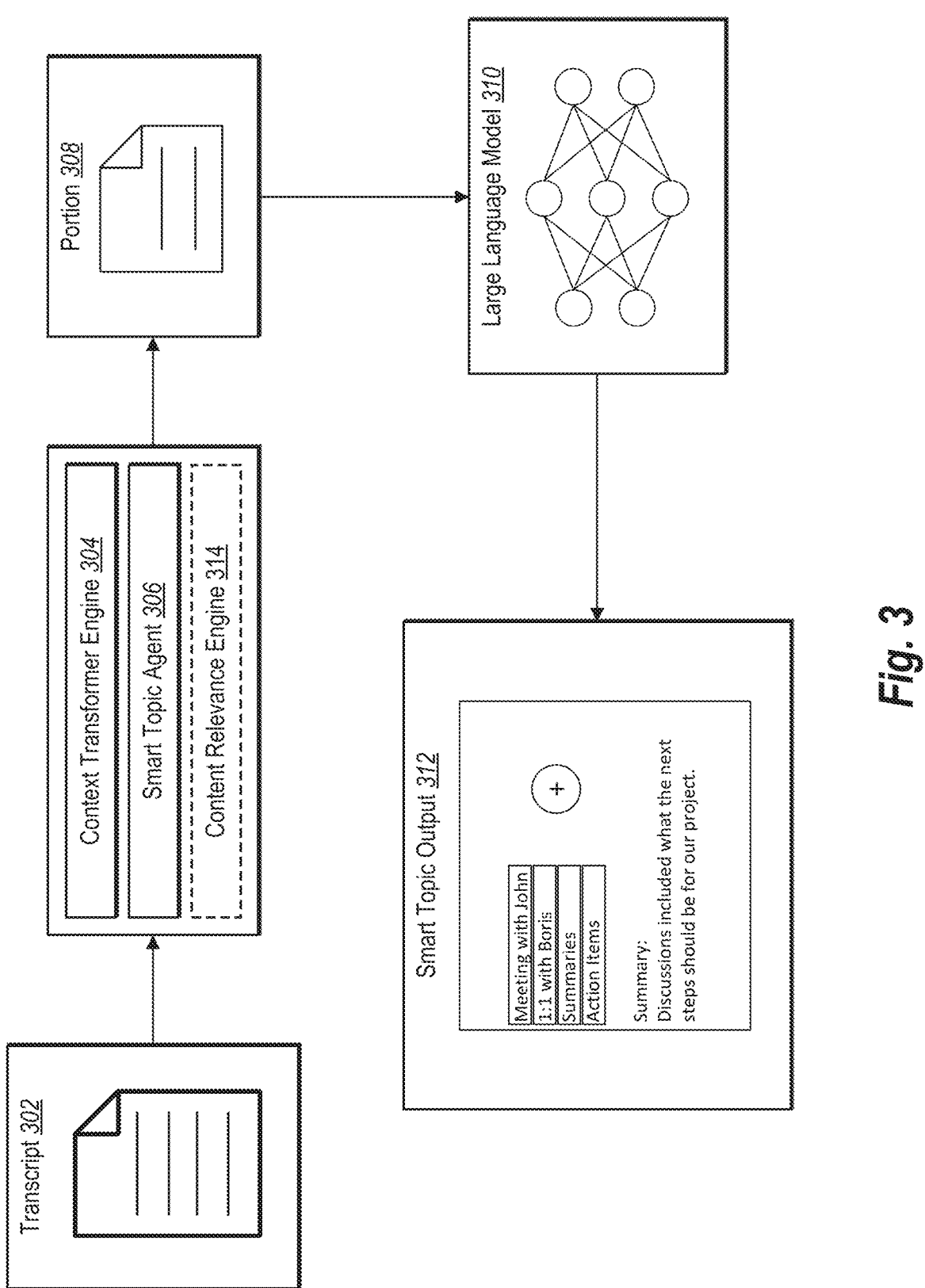
FIG. 3 illustrates an example diagram of the smart topic generation system identifying portions of a transcript and generating a smart topic output in accordance with one or more embodiments.

As previously mentioned, the smart topic generation system 102 utilizes a multi-modal approach to generating a smart topic. In particular, the smart topic generation system 102 utilizes a context transformer engine, a smart topic agent, and a large language model to generate specific smart topic output. FIG. 3 illustrates an example diagram of the smart topic generation system 102 identifying portions of a transcript and generating smart topic output in accordance with one or more embodiments.

As shown, the smart topic generation system 102 generates, receives, or obtains transcript 302. In one or more embodiments, the smart topic generation system 102 obtains transcript 302 of a video call from a transcript system (e.g., transcript system 120) comprising the digital text of a video call. For example, a transcript system can extract video call data from a pre-recorded video call and generate transcript 302. In other embodiments, the smart topic generation system 102 transcript system can be built into the smart topic generation system 102 or into a video call service. For example, the transcript system can extract video call data during a video (e.g., extracting digital text during the duration of the call) and generate a transcript 302.

In certain cases, transcript 302 comprises aggregated video call data over time through different meetings and/or across user accounts. For example, the smart topic generation system 102 determines or identifies transcripts of video calls associated with similar topics (and/or portions of video call transcripts that discuss shared topics), identifies similar/shared action items across video calls, identifies common participants across video calls, and/or common mentions of individuals, user accounts, or topics. The smart topic generation system 102 can further generate and utilize a smart topic agent to analyze the aggregated data (along with other stored data, such as content items and knowledge graph data indicating relatedness between content items, user accounts, and/or topics) for a particular purpose, as described herein.

As shown, the smart topic generation system 102 provides the transcript to the context transformer engine 304, which generates a portion 308 of transcript 302. In particular, the context transformer engine 304 identifies portions of transcript 302 that relate to a smart topic selection (e.g., a user selection from the smart topic interface) or text input of a prompt and generates portion 308. For example, the context transformer engine 304 generates portion 308 by identifying portions or subject matter in the video call data (e.g., text portions) that relate to the smart topic selection or text input and parse out a portion 308 of transcript 302. The context transformer engine 304 can likewise extract additional portions from the transcript 302 and/or other transcripts corresponding to other video calls and/or from other content items stored for a user account within the content management system 104.

As shown, the context transformer engine 304 can utilize a smart topic agent 306 to generate portion 308. In one or more embodiments, the context transformer engine 304 can utilize the smart topic agent 306 as an agent (or computer code segment) specifically spun up or instantiated for a topic. In particular, the context transformer engine 304 can identify that a smart topic selection (e.g., selecting an option in a smart topic interface) or a text input of a prompt indicates or specifies a topic, subject matter, or action for the smart topic output 312 and specifically spins up or instantiates the smart topic agent 306 for the smart topic selection. For example, the context transformer engine 304 can identify that a smart topic selection requests action items participants discussed during a video call and generates a smart topic agent that can parse out portion 308 of transcript 302 that relates action items. In some cases, the smart topic generation system 102 can generate a different smart topic agent for each smart topic that is generated and provided automatically and/or in response to user interaction with a client device.

In other embodiments, the context transformer engine 304 utilizes a smart topic agent incorporated or built-in to the smart topic generation system 102. In particular, the smart topic generation system 102 can comprise a multitude of smart topic agents that perform certain tasks associated with identifying subject matter associated with certain smart topics. For example, the smart topic generation system 102 can comprise built-in smart topic agents that relate to smart topics based on a frequency of user selection, such as a threshold number of users selecting a smart topic element associated with a certain smart topic.

In some embodiments, the smart topic agent 306 communicates or interfaces with context transformer engine 304 to generate inputs for the large language model 310. More specifically, the smart topic agent 306 generates code to provide to a large language model 310 in the form of a high-level objective (e.g., "tell me what everyone's favorite vacation was from last year"). The context transformer engine 304 ingests the prompt and dissects it to break it down into lower-level queries that are executable by large language model 310 and that together result in the desired high-level objective. Thus, the context transformer engine 304 can provide the constituent queries (and corresponding data from stored content items and portion 308) to the large language model 310 to generate respective outputs, and the context transformer engine 304 can generate the ultimate output for the initial high-level objective from the respective outputs. The smart topic agent 306 can further access the high-level output to provide for display within a smart topic interface on a client device.

As shown, the smart topic generation system 102 can also optionally utilize a content relevance engine 314 with the context transformer engine 304 and/or the smart topic agent 306. In particular, the smart topic generation system 102 can utilize content relevance engine 314 to determine relevant topics in relation to a particular user account within transcript 302. Based on identifying that transcript 302 includes relevant content (or is associated with a relevant topic) as determined via content relevance engine 314, the smart topic generation system 102 can further generate, assign, or instantiate the smart topic agent 306 to the transcript 302 (and to other video call transcripts that include relevant content for the same topic/subject matter). For example, the smart topic agent 306 can access data within a knowledge graph and/or organizational chart (associated with content relevance engine 314) and can generate a query for the large language model 310 based on information from both transcript 302 and the knowledge graph/organizational chart (e.g., "create a list of user accounts within the product team with whom I have met in the last three months to discuss the topic of the most recent video call").

Figure 4:
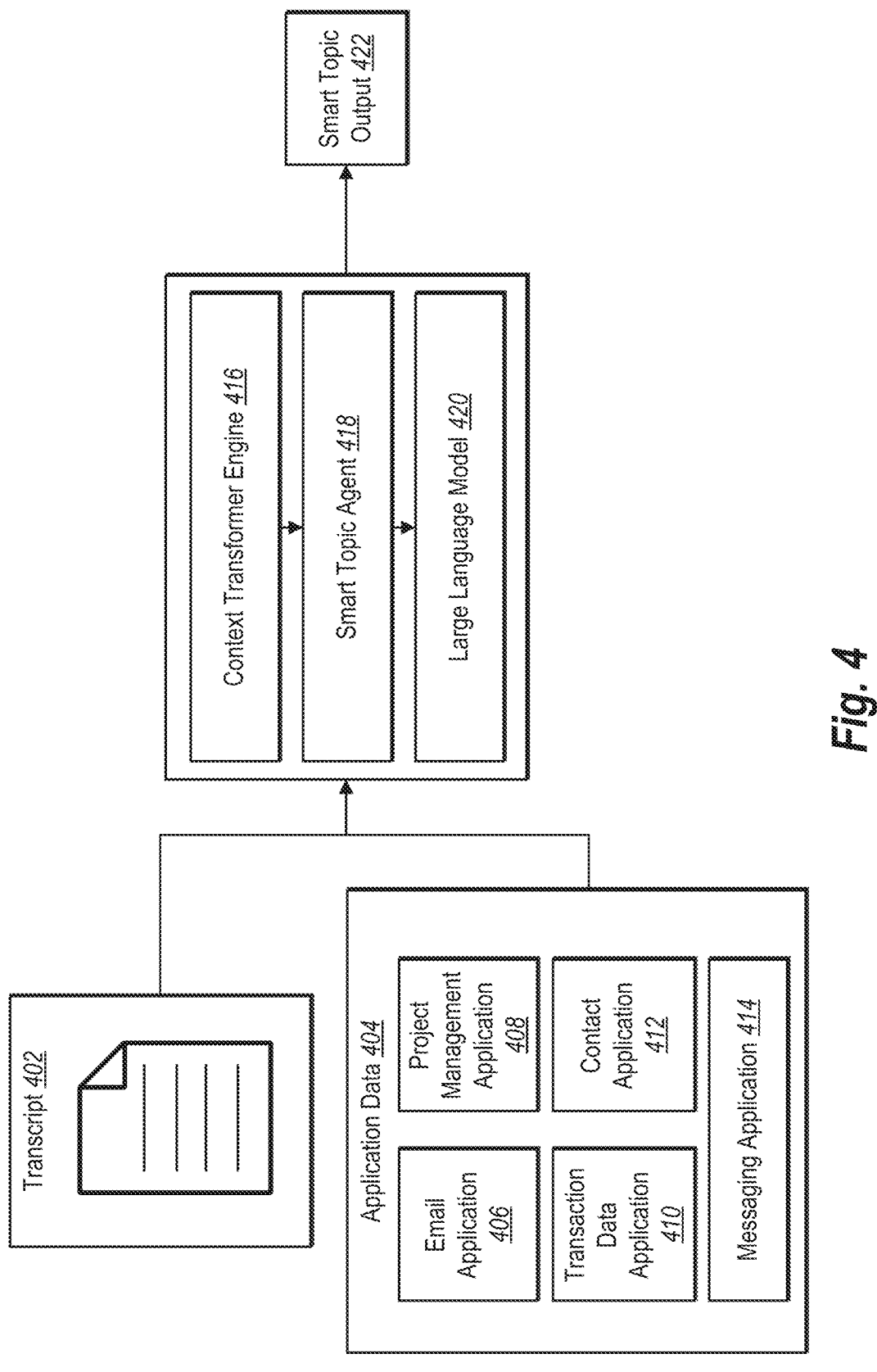
FIG. 4 illustrates an example of the smart topic generation system utilizing application data to generate a smart topic output in accordance with one or more embodiments.

As previously mentioned, the smart topic generation system 102 can utilize other data in conjunction with video call data from a transcript. In particular, the smart topic generation system can extract or obtain application data relevant to a smart topic. FIG. 4 illustrates the smart topic generation system 102 utilizing application data to generate a smart topic output in accordance with one or more embodiments.

As shown, the smart topic generation system 102 receives transcript 402 comprising video call data (as described in relation to FIG. 2 and FIG. 3 above) and application data 404. In particular, the smart topic generation system 102 receives application data from other (non-video call) computer applications executed on a client device associated with transcript 402. For example, the smart topic generation system 102 identifies that a client device participated in a video call of transcript 402 and obtains application data from the client device.

The smart topic generation system 102 can obtain application data from various applications, such as an email application 406. Email application 406 can provide application data associated with various email interactions. To illustrate, application data from email application 406 can include email data (e.g., digital text), email contact information, and/or client device interactions with email application 406.

The smart topic generation system 102 can also receive application data from a project management application 408. For example, the smart topic generation system 102 can receive application data from project management application 408, which can include project data, project team members, project communication interface data, project metrics, and/or client device interactions with project management application 408.

Further, the smart topic generation system 102 can receive application data from transaction data application 410. For example, the smart topic generation system 102 can receive application data from transaction data application 410, which can include data related to transactions, sales data, customer data, call data, and/or user interactions with the transaction data application 410.

In addition, the smart topic generation system 102 can receive application data from a contact application 412. For example, the smart topic generation system 102 can receive contact application data by receiving contact data (e.g., data for contacts with which the client device interacts) and/or client device interactions with the contact application 412.

In addition, the smart topic generation system 102 can receive application data from messaging application 414. For example, the smart topic generation system 102 can receive messaging application data by receiving message data (e.g., digital text of messages), contact information data, and/or client device interactions with the messaging application 414.

As shown, the smart topic generation system 102 can utilize context transformer engine 416, smart topic agent 418, and large language model 420 to generate the smart topic output 422. In particular, the context transformer engine 416, smart topic agent 418, and large language model 420 can parse out related subject matter in transcript 402 and application data 404 to generate smart topic output 422. For example, the smart topic generation system 102 can identify that application data 404 comprises related subject matter to transcript 402 and provide the application data (or a portion of the application data) and transcript 402 (or a portion of transcript 402) as part of smart topic output 422. In some cases, the smart topic output 422 is a summary of one or more transcripts, visual indications or snippets of content items where shared subject matter is mentioned in video transcripts and other content items (e.g., stored emails, transaction data, videos, photographs, and/or documents), generated bullet lists of various topics mentioned during one or more video calls, and/or any other generated content from subject matter mentioned in video calls.

Figure 5A:
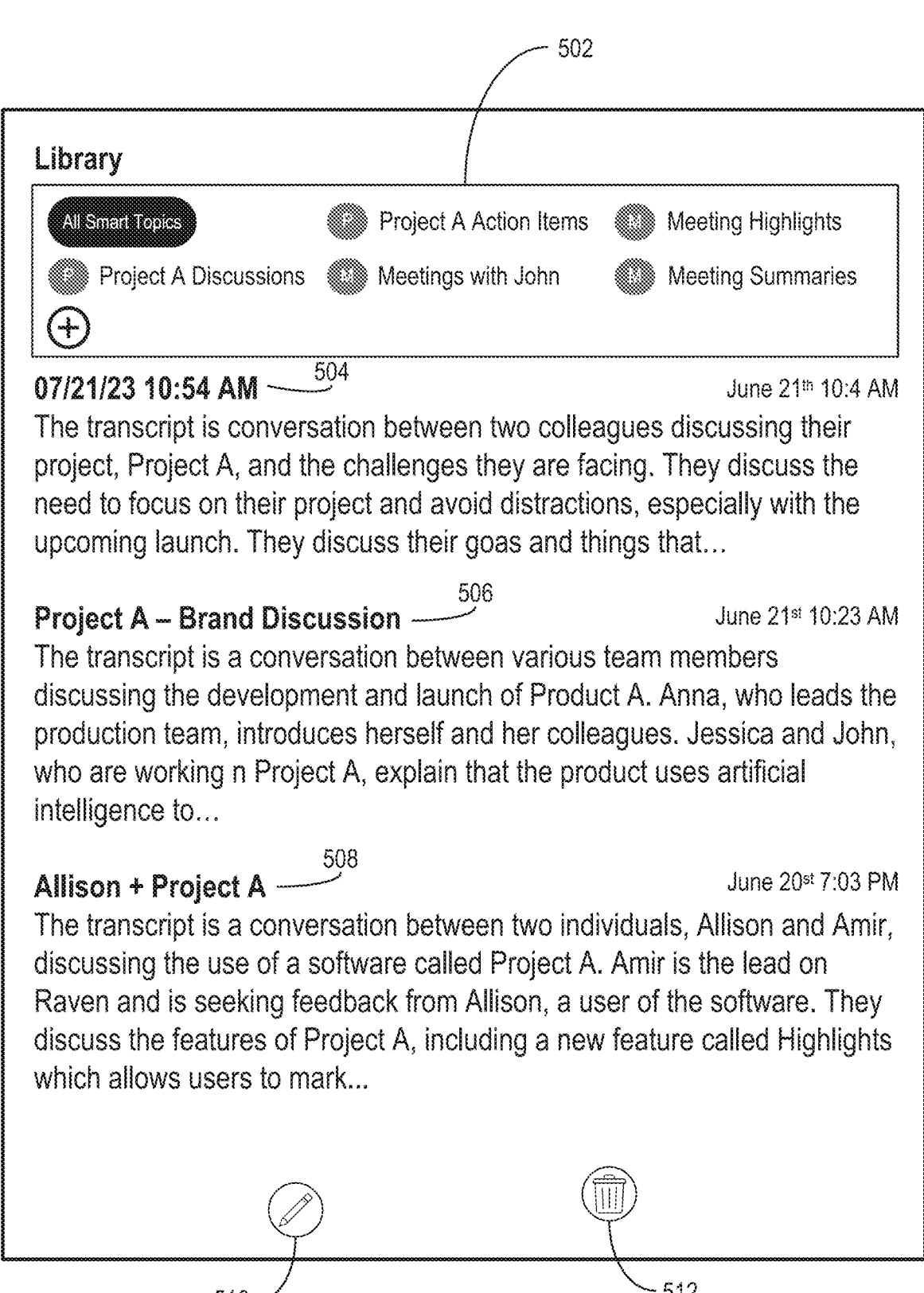
FIGS. 5A-5C illustrate example smart topic interfaces displaying smart topic output and receiving user interactions with smart topic interface elements in accordance with one or more embodiments.
Figure 5B:
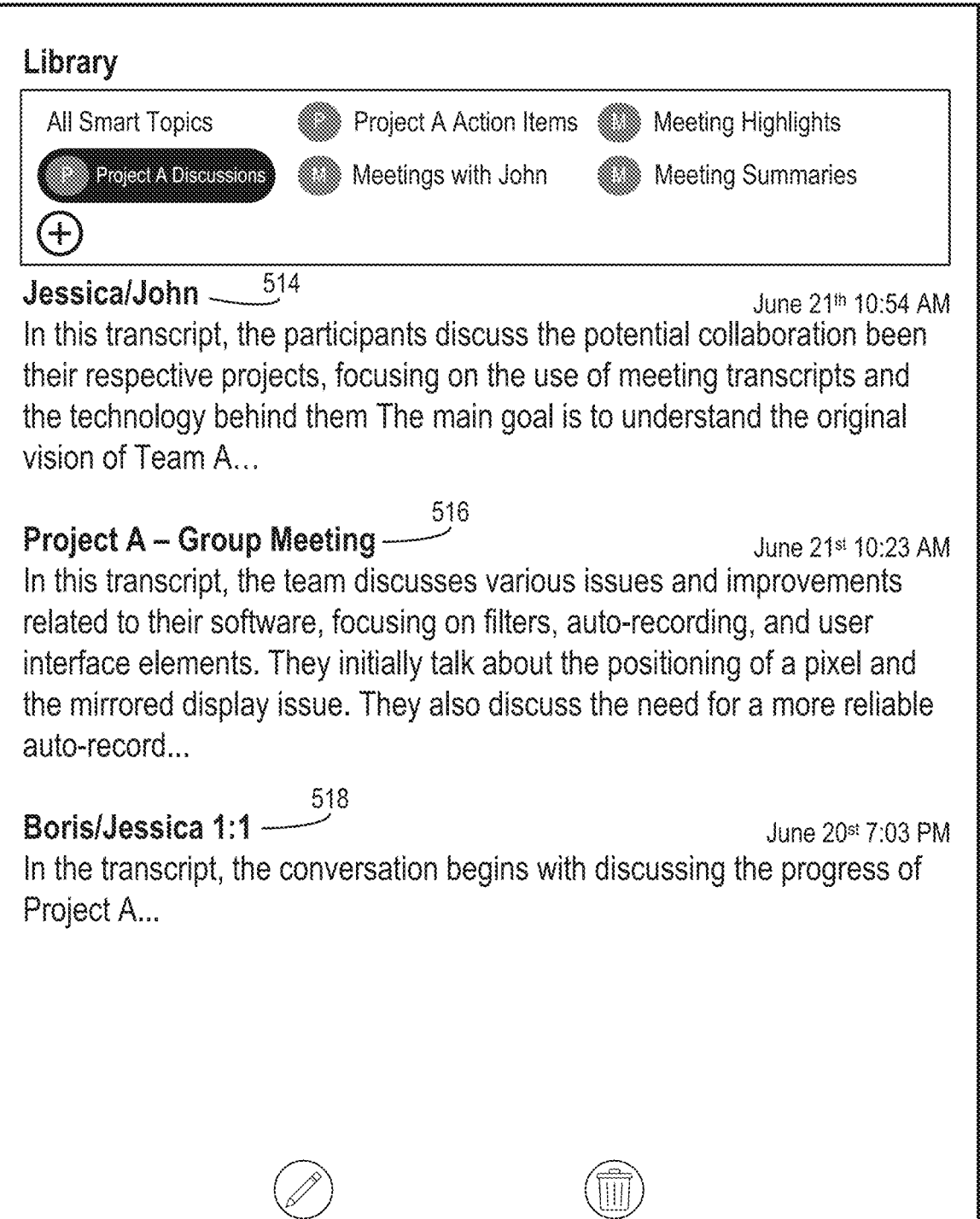
Figure 5C:
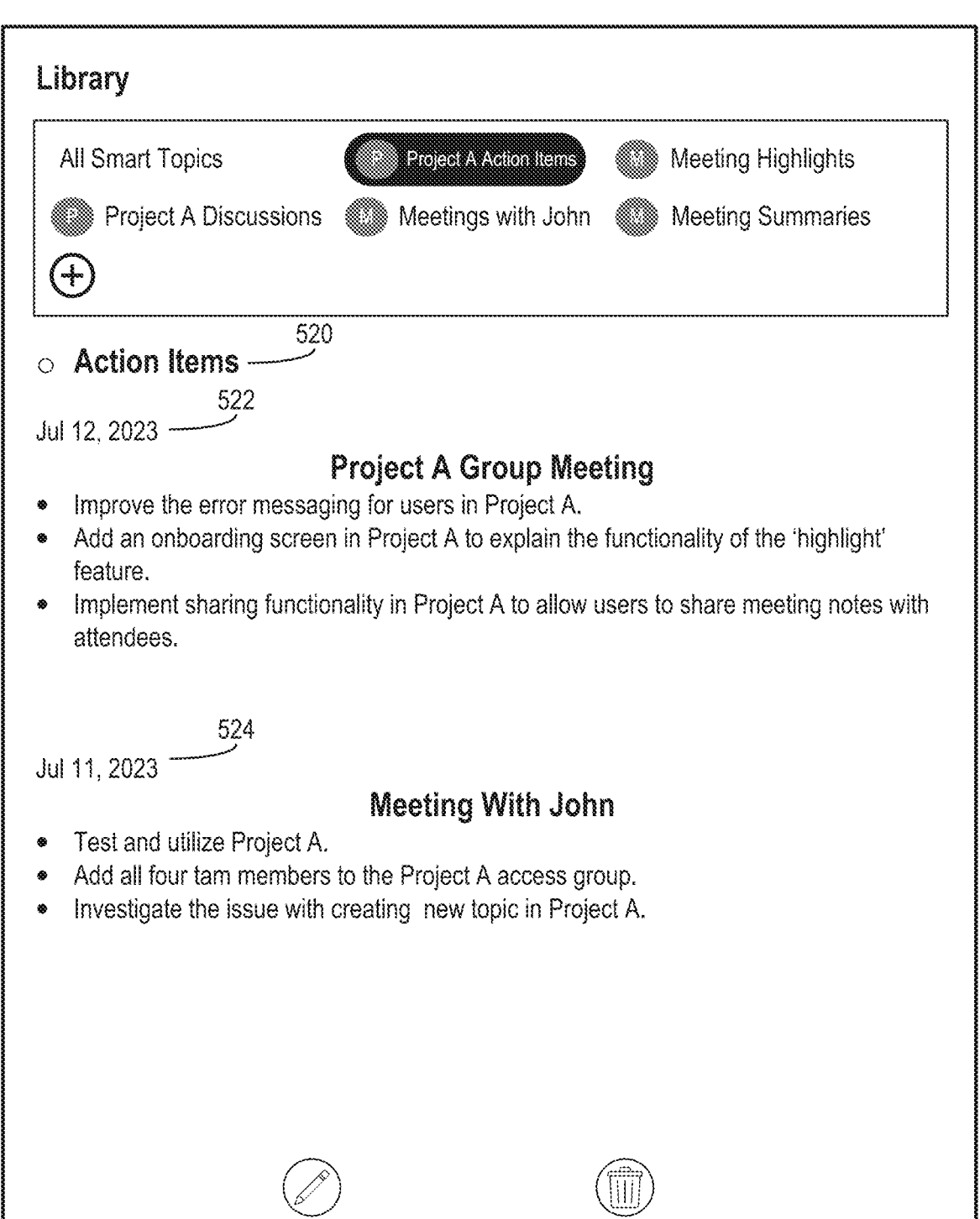

As previously mentioned, the smart topic generation system 102 can utilize a smart topic interface. In particular, the smart topic generation system 102 utilizes the smart topic interface to display smart topic output and receive selections of smart topic interface elements relating to various smart topics. FIGS. 5A-5C illustrate example smart topics displayed via smart topic interfaces in accordance with one or more embodiments. Specifically, FIG. 5A illustrates an example smart topic interface displaying various smart topic outputs as presented on a client device. FIG. 5B illustrates an example smart topic interface displaying smart topic output related to a smart topic as presented on a client device. FIG. 5C illustrates an example smart topic interface displaying smart topic output related to a different smart topic as presented on a client device.

As shown in FIG. 5A, the smart topic generation system 102 can generate smart topic output related to a number of use cases or functions. Specifically, the smart topic output displays information related to a smart topic that includes code to access respective content items (and/or transcripts) stored within a content management system and/or generates a particular LLM prompt. In some cases, the smart topic generation system 102 generates a smart topic that includes code for constructing a data-specific query for an LLM to generate a list of timestamps where certain topics were discussed across one or more video calls, generate summaries for one or more video calls, determine content items related to topics discussed in one or more video calls, group video calls by topic and provide topic-specific selectable elements to view data for the video calls (e.g., recordings, transcripts, shared content items, and/or related content items), determine particular facts or data points across one or more video calls, and/or perform other tasks. In certain cases, the smart topic generation system 102 automatically performs tasks (e.g., tasks that are often repeated or likely to be repeated) associated with one or more smart topics (without user interaction to initiate the smart topic), while in other embodiments the smart topic generation system 102 performs tasks for a smart topic based on user interaction with a client device. The smart topic generation system 102 can use an LLM and a contextual engine to analyze data stored in a knowledge graph and/or an activity history to generate smart topic outputs for display within a smart topic interface, as described herein.

As shown in FIG. 5A, the smart topic generation system 102 displays smart topic outputs in a smart topic interface. Specifically, the smart topic interface can comprise smart topic interface elements 502 that generate respective smart topic outputs. For example, upon detecting a user selection of a smart topic interface element (e.g., "All Smart Topics" or "Project A Action Items") associated with a smart topic, the smart topic generation system 102 can obtain or access a transcript, application data, or a content item, can generate smart topic output, and can display the smart topic output in the smart topic interface.

As illustrated in FIG. 5A, the smart topic generation system 102 can detect or receive a selection of a smart topic interface element "all smart topics" and display related smart topic output. For example, the smart topic generation system 102 can display smart topic output from all smart topics that are associated with a client device or a user account (e.g., of a content management system) associated with the client device. As shown, the smart topic generation system 102 displays various smart topic outputs, including a video call summary 504 ("Jul. 21, 2023 10:54 AM"), a topic-specific smart topic output 506 ("Project A-Brand discussion"), and a topic-account smart output 508 that includes both a particular topic ("Project A") and a particular user account ("Allison"), "Allison+Project A." Moreover, as illustrated, the smart topic generation system 102 can display all smart topics by date (e.g., with the newest on top) or in some other order.

As also shown in FIG. 5A, the smart topic interface can include smart topic edit element 510. In particular, a client device may select the smart topic edit element 510 to edit a smart topic. For example, the smart topic generation system 102 may receive new, different, or updated text inputs that will generate new or updated smart topics. Accordingly, editing a smart topic can result in new or updated smart topic output in the smart topic interface. For example, the smart topic generation system 102 can receive modifications to existing smart topics by adjusting user accounts and/or topics/subject matter for smart topics and/or sources from which smart topic outputs are generated (e.g., video call transcripts, application data, or stored content items).

Moreover, as shown, the smart topic interface can also include smart topic delete element 512. Specifically, upon detecting a selection of the smart topic delete element, the smart topic generation system 102 will delete a smart topic and the associated smart topic output. In some cases, deleting a smart topic will result in an updated (or refreshed) smart topic interface displaying updated smart topic output.

As illustrated in FIG. 5B, the smart topic generation system 102 can also display smart topic outputs related to respective smart topics. Specifically, the smart topic generation system 102 can detect a selection of a smart topic element related to a smart topic and can display a smart topic output related to that smart topic. As illustrated, the smart topic generation system 102 detects a selection of the smart topic interface element "Project A Discussions" and displays the smart topic output related to Project A Discussions. For example, the smart topic generation system 102 analyzes a video transcript to generate three different smart topics outputs under the smart topic of "Project A Discussions," including a first smart topic output 514 indicating a conversation between two particular user accounts ("Jessica/John"), a second smart topic output 516 indicating a group conversation pertaining to Project A ("Project A-Group Meeting"), and a third smart topic output 518 indicating a one-on-one conversation between user accounts Boris and Jessica ("Boris/Jessica 1:1"). In certain embodiments, the smart topic generation system 102 generates the smart topic outputs from the same video call transcript and/or from different video call transcripts, where one smart topic output can include content from multiple video call transcripts, or where each smart topic output is generated from its own video call transcript. In some cases, the smart topic generation system 102 can display smart topic outputs by displaying portions of a transcript (or application data), summaries, bullet points of actions items, vocabulary terms specific to the video call, lists of user accounts who are familiar with and/or have worked on projects/topics mentioned in a video call (e.g., as indicated by a knowledge graph), or other types of output.

As just mentioned, and as illustrated in FIG. 5C, the smart topic generation system 102 can also generate a smart topic output in the form of action items 520. Specifically, the smart topic generation system 102 can detect or identify action items 520 representing actions that were discussed in a video call and can display the action items upon detection of a selection of a smart topic interface element corresponding to action items. For example, the smart topic generation system 102 can identify action items discussed in one or more video calls that include a particular user account. As illustrated, the smart topic generation system 102 identifies action items from a video call 522 and action items from a video call 524. Indeed, by receiving a selection within the smart topic interface of the "Project A Action Items" element, the smart topic generation system 102 can analyze video call transcripts and/or other content items and application data to generate the action items 520 corresponding to Project A.

Figure 6C:
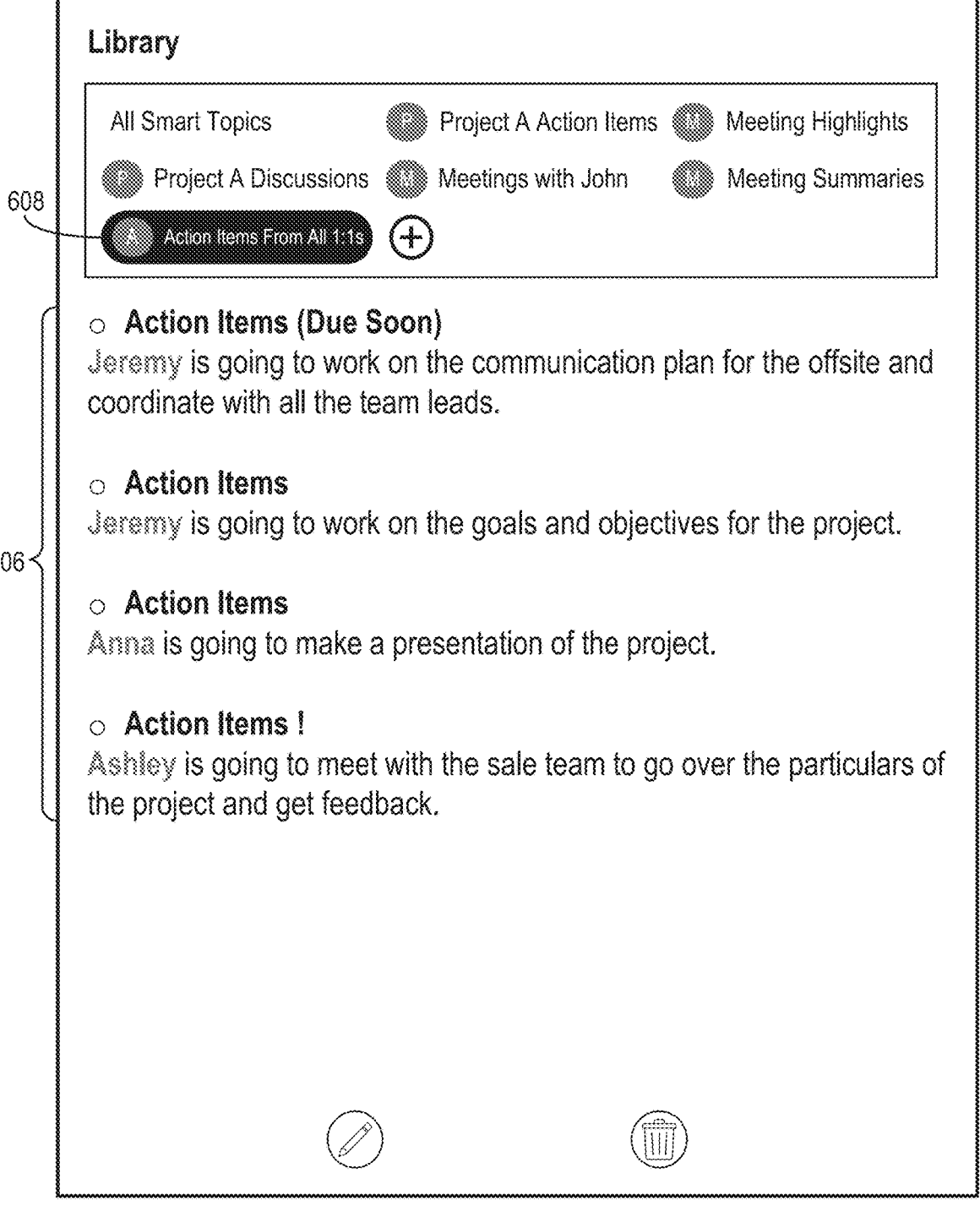

As previously mentioned, the smart topic generation system 102 can generate smart topic output based on text input. Specifically, the smart topic generation system 102 can generate smart topic outputs based on text input from a client device specifying certain subject matter or indicated a particular video call and/or type of requested smart topic output (e.g., a list of action items vs. a summary of topics discussed). FIGS. 6A-6C illustrate receiving a text input and generating a smart topic output in accordance with one or more embodiments. Specifically, FIG. 6A illustrates receiving a user selection of a smart topic generation element as presented on a client device. In addition, FIG. 6B illustrates an example smart topic interface element for receiving text input as presented on a client device. Further, FIG. 6C illustrates a smart topic interface displaying smart topic output of the generated smart topic as presented on a client device.

As shown in FIG. 6A, the smart topic generation system 102 can receive or detect the selection of a smart topic generation element 602 from a client device. In response to the selection, the smart topic generation system 102 can generate an interface window for entering or defining a smart topic, including a name for the smart topic, information to include in a corresponding smart topic output for the smart topic, and/or sources from which to generate the smart topic output (e.g., video call transcripts, application data, and/or content items). Indeed, as shown in FIG. 6B, in response to the selection of the smart topic generation element 602, the smart topic generation system 102 can generate a smart topic interface element 604 in the form of a smart topic definition window for receiving text input defining a prompt to generate a smart topic output. In particular, the smart topic generation system 102 can initiate a window or other element in the smart topic interface in which to receive text input indicating a prompt. For example, as shown, the smart topic generation system 102 receives text input to generate a smart topic for "Action Items from all 1:1s." In addition, the smart topic generation system 102 receives a prompt defining parameters for generating the smart topic output, including a format for the smart topic output ("I would want a list of all my action items . . . " and "I would be happy if you organized it as a list with 2 buckets . . . ") along with clarifying definitions to help a large language model understand terms used in the prompt ("Urgent and Important to me means . . . "). As shown, the smart topic generation system 102 can also receive selections of suggested smart topic parameters to further define smart topic, including selectable elements for "1:1 meetings," "Action items: Joey," and others.

In some embodiments, the smart topic generation system 102 utilizes the text input as a prompt for a large language model to generate a specific output. In particular, the smart topic generation system 102 utilizes a context transformer engine to determine the overall objective from the prompt and to generate sub-prompts from the prompt, where each sub-prompt results in a respective intermediate output from a large language model and/or from another model or source. The context transformer engine further generates a smart topic agent for each of the sub-prompts, and the smart topic agents access data (e.g., from knowledge graphs, organizational charts, stored content items, or other sources) to generate respective outputs using a large language model and/or other models. In some cases, the context transformer engine parses a video transcript (and/or generates a smart topic agent to parse a video transcript) to determine which portions of the video transcript (and/or to determine relevant portions of other application data or content items) correspond to which of the sub-prompts from the overall prompt/objective (e.g., based on related subject matter or other relevance indicators). The smart topic agents further communicate with a large language model to provide the corresponding transcript portions and/or other data to generate respective intermediate outputs. The smart topic generation system 102 can further compile or combine the intermediate outputs from the individual smart topic agents into a smart topic output using the context transformer engine. The smart topic generation system 102 can further generate a smart topic output from the information included in the smart topic interface element 604.

Indeed, as illustrated in FIG. 6C, the smart topic generation system 102 can generate a smart topic output based on the text input for the prompt. As shown, the smart topic generation system 102 generates the smart topic output based on the parameters of the prompt and other data defined as part of the smart topic. For instance, the smart topic generation system 102 accesses or obtains a transcript (and application data and/or stored content items) and utilizes the context transformer engine, the smart topic agent, and the large language model to generate a smart topic output 606 for display in the smart topic interface. As shown, the smart topic generation system 102 displays smart topic output 606 comprising action items in accordance with the defined parameters. Indeed, the smart topic output 606 is a list of action items corresponding to urgent and important items, where some are indicated as due soon, and others are due eventually (as defined in the parameters for the smart topic).

In some embodiments, as shown in FIG. 6C, the smart topic generation system 102 can generate a smart topic element that corresponds to the newly created smart topic (e.g., as defined via the parameters set in FIG. 6B). Specifically, the smart topic generation system 102 can add the smart topic to a collection of smart topics associated with a user account. The smart topic generation system 102 can further provide smart topic elements for each of the smart topics in the collection. Thus, the smart topic generation system 102 can generate a smart topic element 608 that, upon selection, will display the smart topic output associated with the smart topic defined in FIG. 6B.

Figure 7A:
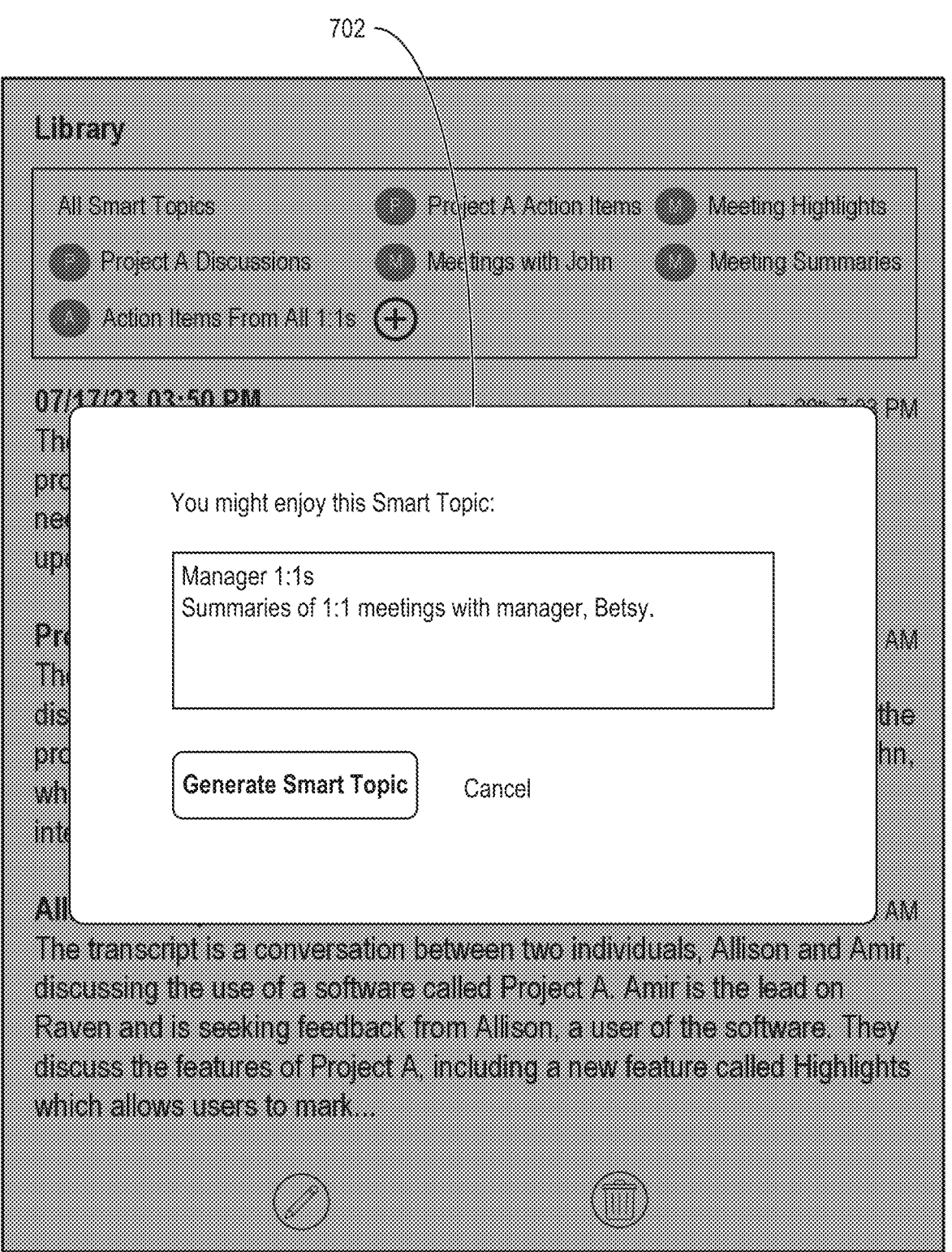

In some embodiments, the smart topic generation system 102 can generate a suggested smart topic based on identifying related subject matter within a video transcript and/or across multiple video transcripts. In particular, the smart topic generation system 102 can identify that a transcript (or one or more transcripts), application data, and/or content items comprise related subject matter to use as a basis for suggesting a smart topic. FIGS. 7A-7B illustrate an example of the smart topic generation system 102 suggesting a smart topic in accordance with one or more embodiments. Specifically, FIG. 7A illustrates smart topic generation system 102 suggesting a smart topic. Thereafter, FIG. 7B illustrates the smart topic generation system 102 providing smart topic output corresponding to the suggested smart topic in the smart topic interface.

As mentioned, in one or embodiments, the smart topic generation system 102 identifies that subject matter in a transcript (or multiple transcripts) matches or corresponds to subject matter indicated by application data from other computer applications and/or subject matter depicted or represented within one or more content items stored for a user account. The smart topic generation system 102 can further generate a smart topic based on the shared or related subject matter across the video transcripts and other content sources. In some cases, the smart topic generation system 102 generates or suggests the smart topic automatically (e.g., without interaction with a client device) upon detecting or identifying the related subject matter. For example, as the smart topic generation system 102 can store data or information indicating a frequency (or a recency or an overall number of instances) with which certain subject matter is found in video transcripts or other application data. Based on the frequency (and/or the recency) meeting a certain threshold, the smart topic generation system 102 can generate a suggested smart topic to present in the smart topic interface. As illustrated, the smart topic generation system 102 generates suggested smart topic 702 and provides the suggested smart topic in the smart topic interface, including the parameters of the smart topic defining the data to include in the corresponding smart topic output (e.g., "Summaries of 1:1 meetings with manager, Betsy").

In one or more embodiments, the smart topic generation system 102 suggests smart topics based on activity history of a user account, collaborating user account group, or other associated accounts. Specifically, the smart topic generation system 102 can identify that subject matter from which the smart topic generation system is generating a smart topic (e.g., transcript, application data and/or content item) is associated or related to subject matter in one or more previously generated smart topics. For example, the smart topic generation system 102 can identify that subject matter in a transcript (e.g., a discussion in a video call) is similar to subject matter in an existing smart topic, a previously generated smart topic, or a smart topic associated with a user account of a collaborating user account group.

As illustrated in FIG. 7B, the smart topic generation system 102 can display smart topic output corresponding to the suggested smart topic 702. Specifically, based on a selection to generate a smart topic output for the suggested smart topic 702, the smart topic generation system 102 generates and displays smart topic output 704. As shown, the smart topic generation system 102 displays smart topic output in the form of summaries related to the suggested smart topic of "Manager 1:1s," as indicated by the parameters of the smart topic. In some cases, a smart topic output includes transcript portions, summaries, action items, and/or other smart topic output related to a suggested smart topic.

Figure 8A:
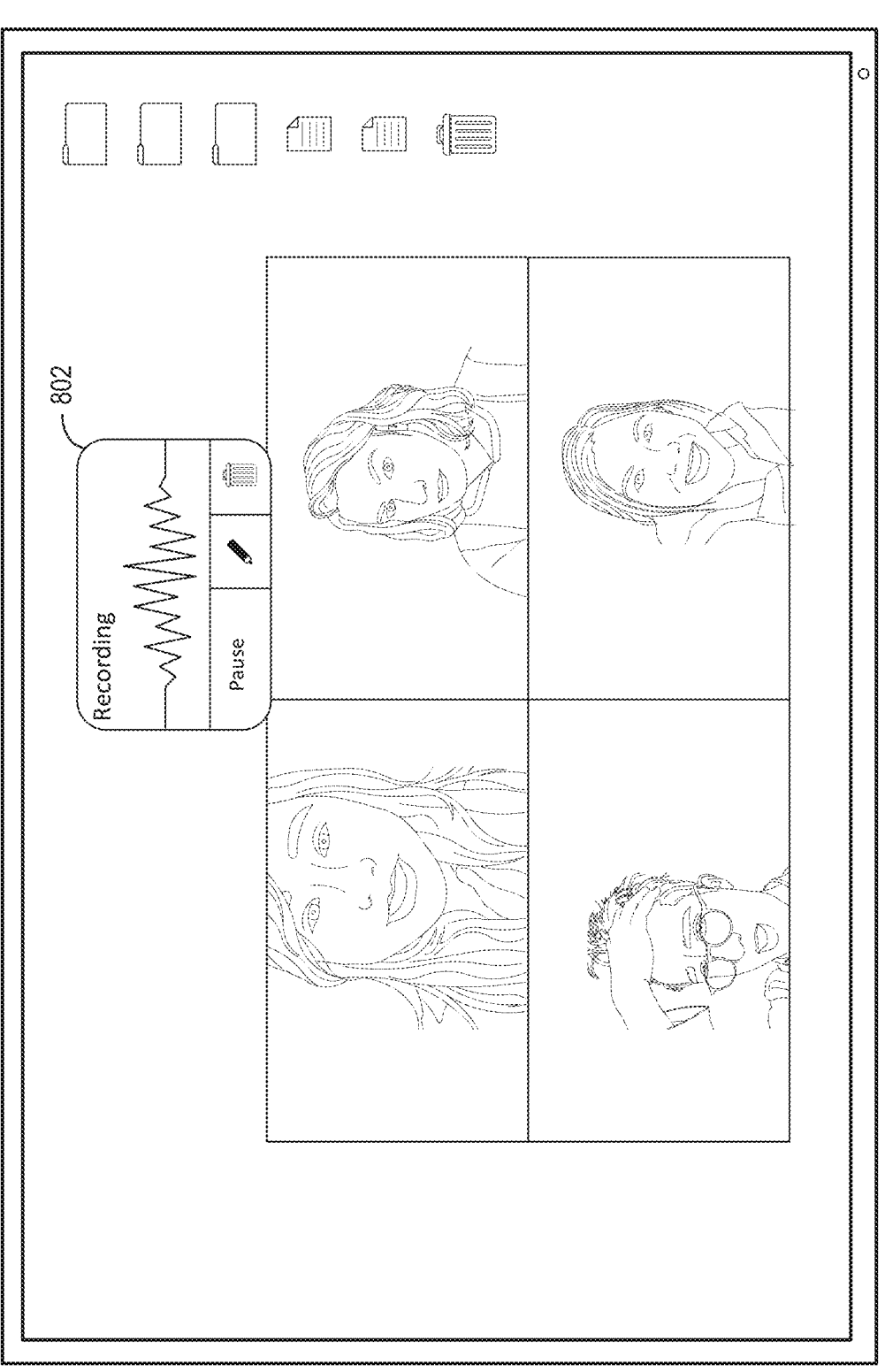
FIGS. 8A-8C illustrate an example smart topic interface element utilized with a video call in accordance with one or more embodiments.
Figure 8B:
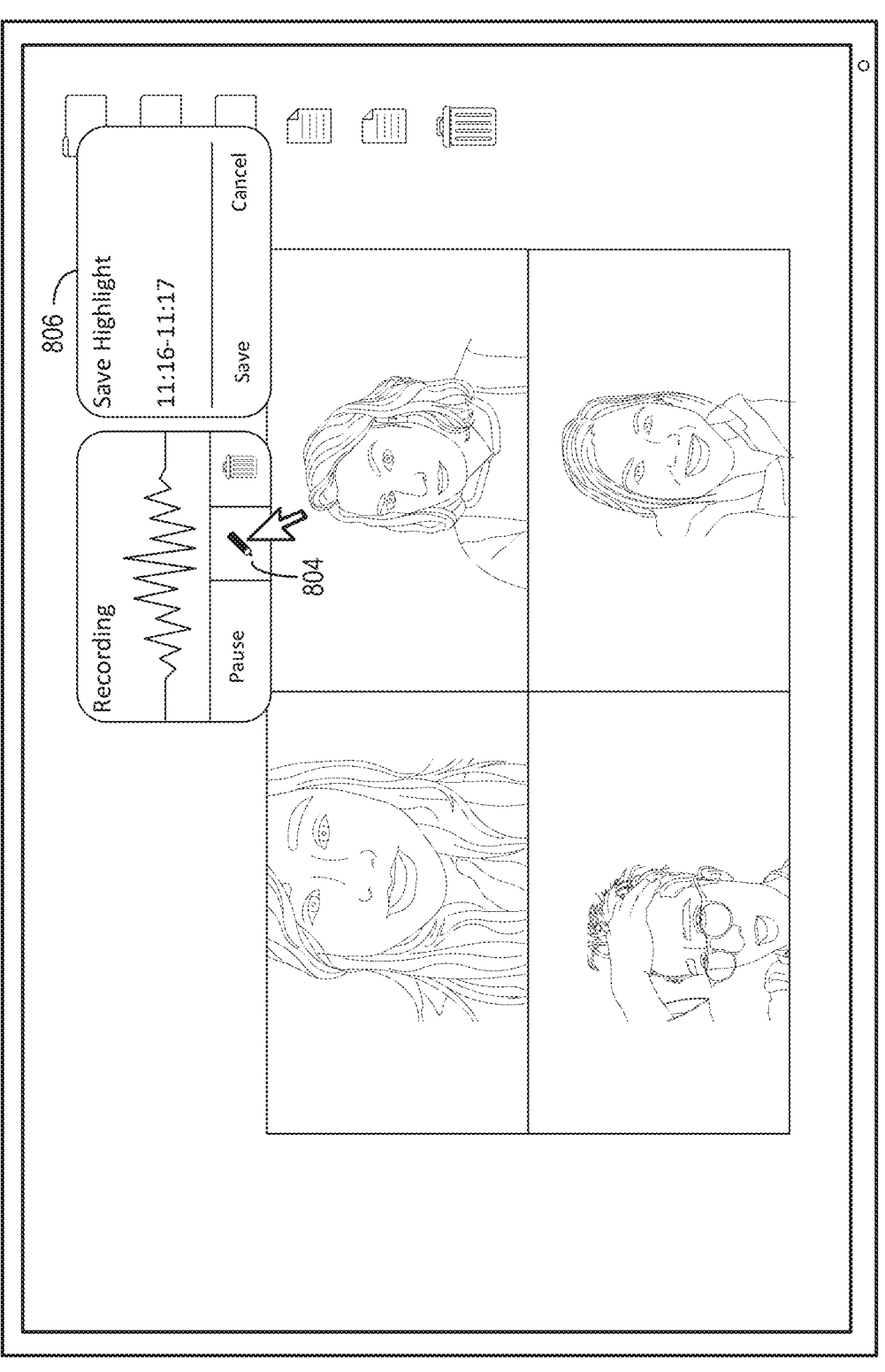
Figure 8C:
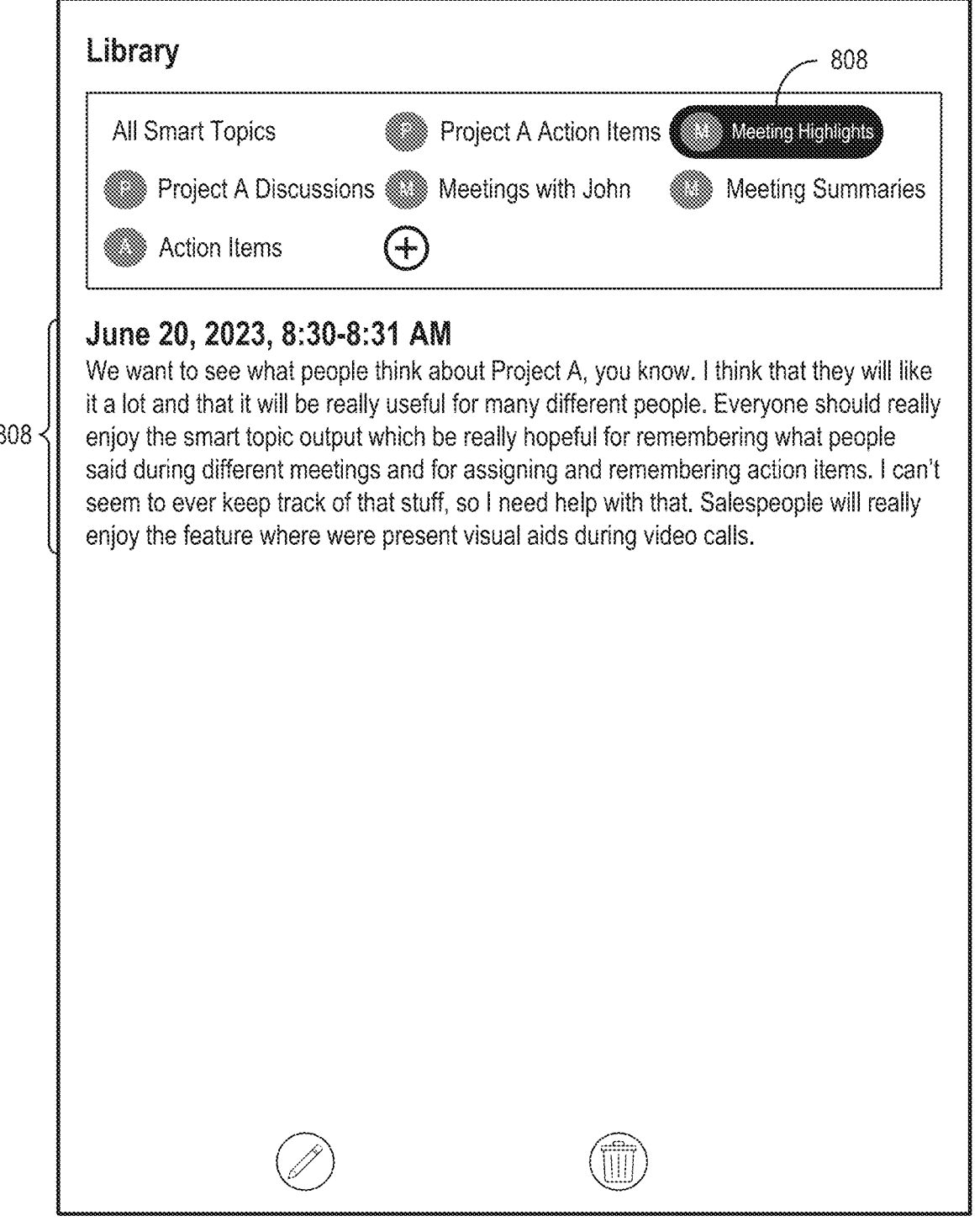

In one or more embodiments, the smart topic generation system 102 can utilize a smart topic interface element to indicate certain actions in relation to a video call. Specifically, the smart topic generation system 102 can initiate a smart topic interface element to notify participants that the smart topic generation system 102 is recording and/or transcribing the video call to generate a smart topic. FIGS. 8A-8C illustrate an example smart topic interface element utilized with a video call in accordance with one or more embodiments. Specifically, FIG. 8A illustrates receiving a smart topic interface element. FIG. 8B illustrates receiving a selection of a smart topic generation element in the smart topic interface element. FIG. 8C illustrates example smart topic output corresponding to the smart topic generation element.

As illustrated in FIG. 8A, the smart topic generation system 102 can initiate a smart topic interface element 802 for display on a client device participating in a video call. In particular, the smart topic generation system 102 can detect that a client device is participating in a video call based on the client device initiating a video call interface. In some cases, the smart topic generation system 102 generates and provides the smart topic interface element 802 for display upon detecting the video call. In other cases, the smart topic generation system 102 provides the smart topic interface element 802 upon receiving user interaction with the client device to initialize recording the video call. In some embodiments, the smart topic generation system 102 can identify that a client device began participating in a video call based on identifying that the client device initiated a video stream on the video call interface.

In one or more embodiments, the smart topic generation system 102 can provide an indication in the smart topic interface element 802 that the smart topic generation system 102 is gathering data. Specifically, the smart topic generation system 102 can show a recording indicator that represents that the smart topic generation system 102 is extracting video call data or generating a transcript during the video call. For example, a recording indicator could be an icon or an interactive display that shows recording signals (e.g., wavelength depictions). In some cases, based on privacy settings, the smart topic generation system 102 does not record video call data such as video and audio data, but instead transcribes a video call on the fly and saves or stores only the transcription without the video and audio data. In these or other cases, the smart topic generation system 102 can store only certain portions of a video transcript, such as those portions corresponding to a smart topic selected via a client device (discarding other, unrelated portions of the transcript) during or before the video call.

Moreover, in some embodiments, the smart topic generation system 102 can pause or stop extracting video call data based on receiving a client device selection in the smart topic interface element. Specifically, the smart topic generation system 102 can receive a selection of a pause element to pause extracting video call data for a time, such as until receiving another selection of the pause element. Moreover, the smart topic generation system 102 can stop extracting video call data based on receiving a selection of the stop element in the smart topic interface element.

As illustrated in FIG. 8B, the smart topic generation system 102 can also receive a selection of a smart topic generation element 804 in the smart topic interface element. In particular, based on receiving the selection of a smart topic generation element 804, the smart topic generation system 102 can open an additional smart topic interface element 806 in which to receive further selections or input regarding the smart topic (e.g., to save a certain duration of a video call, or its transcript, between two timestamps as a highlight). In some embodiments, the smart topic generation system can receive a text input in the additional smart topic interface element 806 and can use the text input to define parameters for a smart topic (e.g., including a prompt for a large language model). In some cases, the smart topic generation system 102 can generate a timestamp indicating the time that the smart topic generation system 102 received the text input and can use video call data (e.g., transcript text discussed a particular subject matter) at the timestamp to generate the smart topic.

In one or more embodiments, the smart topic generation system 102 generates a specified smart topic output based on interaction with a smart topic interface element. Specifically, the smart topic generation element 804 can correlate to a specified smart topic such that, upon selection of the smart topic generation element 804, the smart topic generation system 102 generates the specified smart topic output. For example, the smart topic generation element can correlate to a meeting highlights smart topic that, upon selection, generates a smart topic output in the form transcript snippets corresponding time periods indicating various discussed topics during the video call. In some cases, if the smart topic generation element corresponds to a smart topic of "meeting highlights," the smart topic generation system 102 can generate a smart topic output by summarizing transcript segments corresponding to different topics and/or separated by certain time durations.

As mentioned, in some embodiments, the smart topic generation system 102 displays a smart topic output from a smart topic interface element in a smart topic interface. Specifically, as illustrated in FIG. 8C, the smart topic generation system 102 can generate and display smart topic output 808 corresponding to a selection of the smart topic generation element. For example, if the smart topic generation system 102 receives a selection (or text input) to generate a highlight, the smart topic generation system 102 can display meeting highlights as smart topics in the smart topic interface. To illustrate, the meeting highlight smart topic can display a portion of the transcript that comprises a digital text representation of spoken language from the video call.

Figure 9:
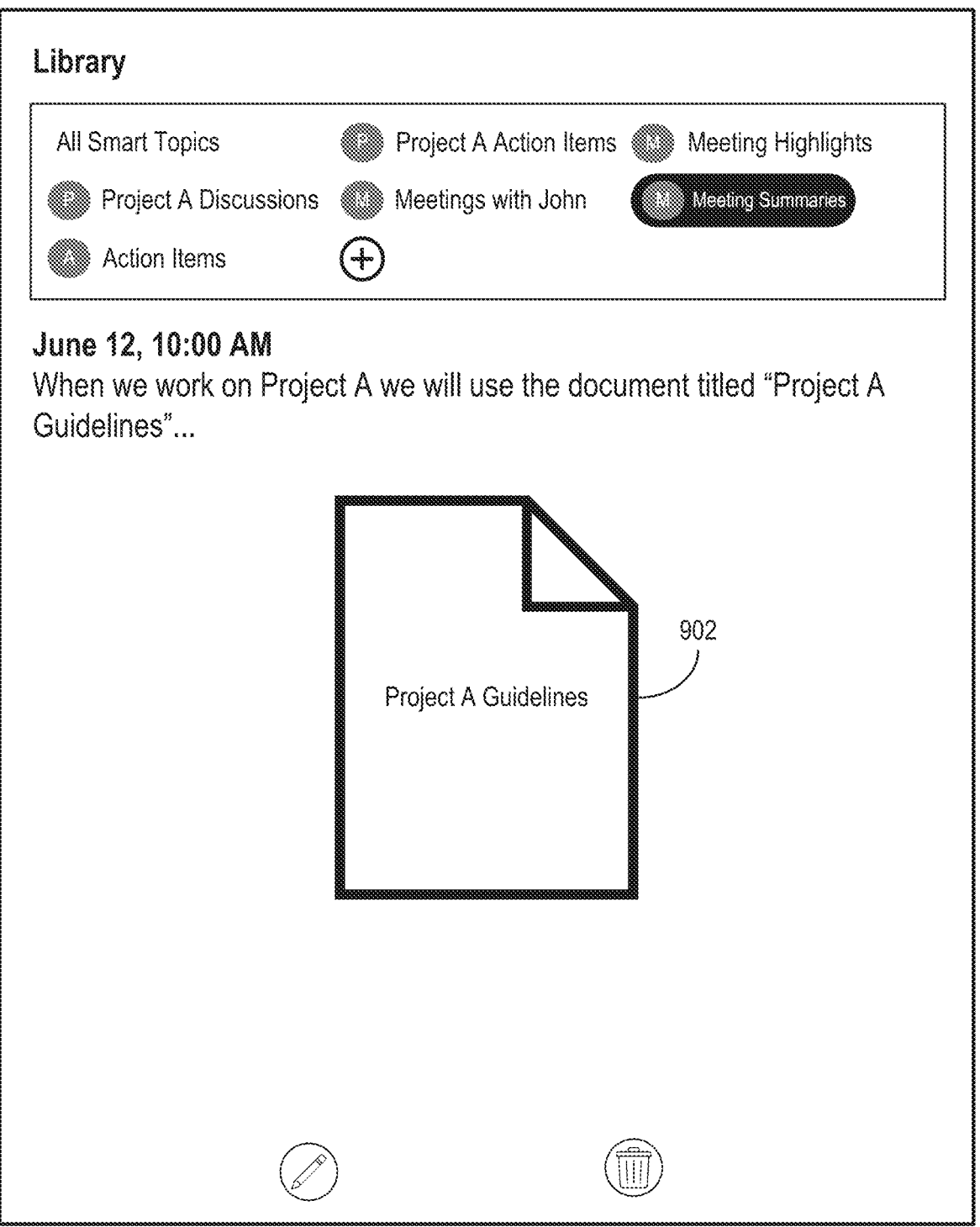
FIG. 9 illustrates an example of the smart topic generation system providing a suggested content item within a smart topic interface in accordance with one or more embodiments.

As previously mentioned, the smart topic generation system 102 can identify content items corresponding to smart topics. In addition, the smart topic generation system 102 can generate suggest a content item during a video call based on detecting subject matter of a smart topic. For example, the smart topic generation system 102 determines that a content item stored for a user in a content management system is related to a smart topic presents the content item in the smart topic interface with the smart topic output. FIG. 9 illustrates an example of the smart topic generation system providing a suggested content item within a smart topic interface in accordance with one or more embodiments.

In some embodiments, the smart topic generation system 102 provides a content item in a smart topic interface based on determining that a video call (e.g., live in real time) relates to the content item. In these or other embodiments, the smart topic generation system 102 can determine that a content item corresponds to subject matter of a smart topic and can provide the content item as part of (or accompanying) a smart topic output for the smart topic. Specifically, the smart topic generation system 102 can identify that the smart topic output references or identifies a content item 902 and provide the content item 902 in the smart topic interface with the smart topic output. For example, the smart topic generation system 102 can identify that participants of a video call discuss a content item by name and provide the content item in the smart topic interface.

In one or more embodiments, the smart topic generation system 102 identifies that the content item 902 and the transcript comprise related subject matter. Specifically, the smart topic generation system 102 identifies that subject matter in the content item 902 and the transcript comprise related subject matter by utilizing the context transformer engine and/or a content extraction engine to generate compare subject matter labels or topics associated with the content item 902 and the transcript. In some cases, the smart topic generation system 102 further generates and compares subject matter labels for application data from other computer applications to compare with the content item 902 and/or a video transcript. For example, the smart topic generation system 102 identifies that the content item 902 and the transcript (and, in some cases application data) comprise related subject matter based on various contextual data, including graph information from a knowledge graph and/or historical user account behavior.

Further, in some embodiments, the smart topic generation system 102 can also provide an option to open or surface the content item 902 from the smart topic interface. Specifically, the smart topic generation system 102 can present the content item 902 in a smart topic interface as a selectable option that, when selected, surfaces the content item 902. In some cases, the smart topic generation system 102 can surface the content item 902 within the smart topic interface. In other cases, the smart topic generation system 102 will open the content item 902 in another application or interface.

Figure 10:
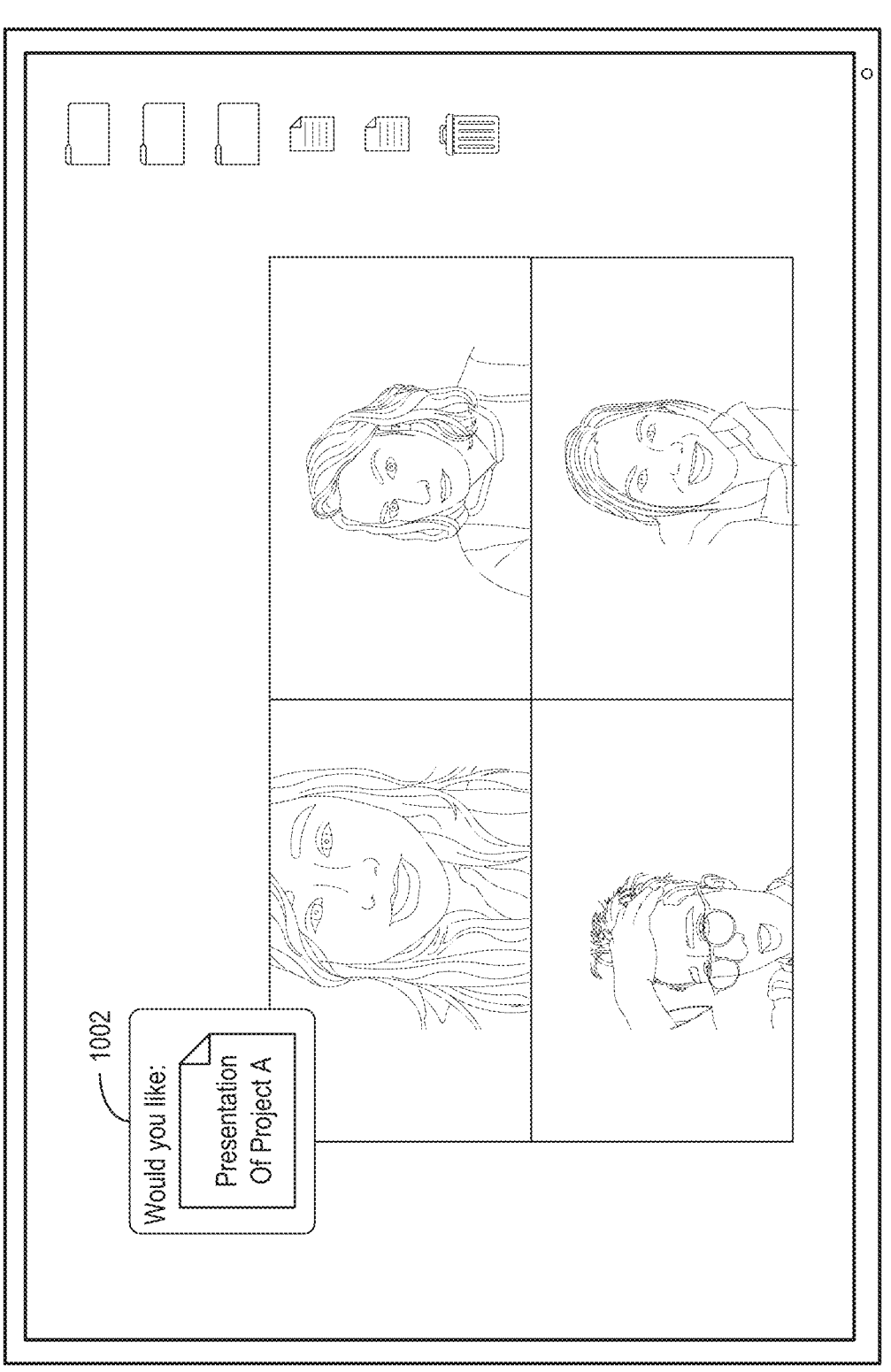
FIG. 10 illustrates an example of the smart topic generation system providing suggested content items in a smart topic interface element during a video call in accordance with one or more embodiments.

As indicated above, in some embodiments, the smart topic generation system 102 can also provide content items or applications during a video call. Specifically, the smart topic generation system 102 can provide content items in a smart topic interface element that relate to the subject matter detected during a video call. FIG. 10 illustrates an example of the smart topic generation system providing suggested content items in a smart topic interface element during a video call in accordance with one or more embodiments.

In some embodiments, the smart topic generation system 102 provides content items in the smart topic interface element based on historical user interactions during video calls. Specifically, the smart topic generation system 102 can detect that the client device interacted with specific content items (e.g., photos, videos, visual aids, documents, emails, digital messages, or other application data) during previous video calls and can provide the content items in the smart topic interface element 1002 based on the detection. For example, the smart topic generation system 102 can suggest the content item based on identifying that the client device accessed the content item in previous video calls, such as previous video calls that occurred at the same time of week (e.g., regular meetings) and/or video calls that discussed similar subject matter. To illustrate, if the smart topic generation system 102 identifies that in previous video calls, the client device accessed a visual aid shared to other devices during the video call, the smart topic generation system 102 can provide the visual aid in the smart topic interface element 1002.

In other embodiments, the smart topic generation system 102 can provide content items in the smart topic interface element 1002 based on subject matter discussed during the video call. In particular, the smart topic generation system 102 extracts video call data during the video call and identifies that a content item is related to subject matter in the extracted video call data. For example, if the smart topic generation system 102 identifies from the extracted video call data that the participants in a video call are discussing sales figures, the smart topic generation system 102 can provide a content item that discusses sales figures.

Figure 11:
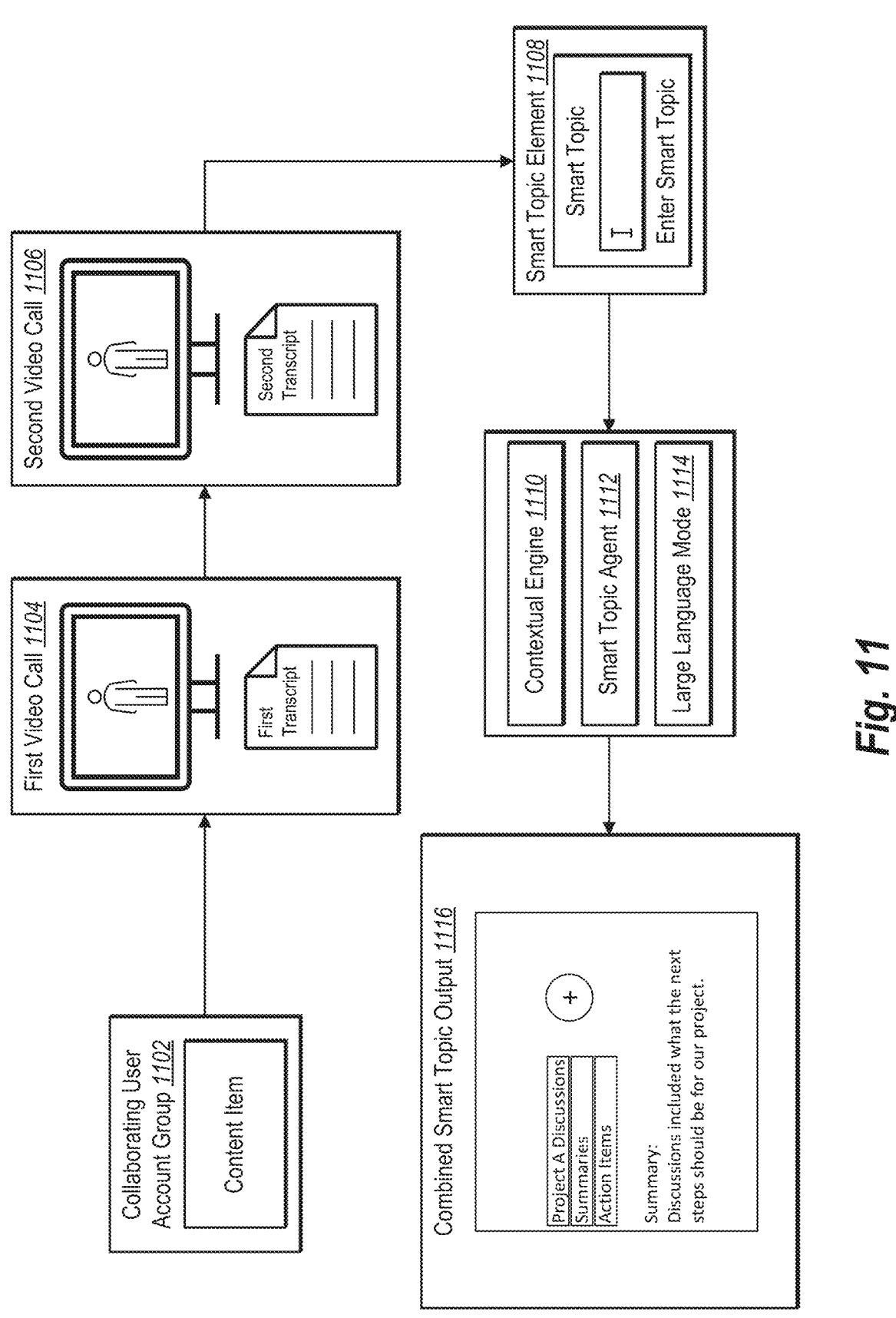
FIG. 11 illustrates an example diagram of an overview of the smart topic generation system generating a combined smart topic in accordance with one or more embodiments.

As previously mentioned, the smart topic generation system 102 can generate a combined smart topic. In particular, the smart topic generation system 102 generates a combined smart topic from video calls associated with user accounts within a collaborating user account group. FIG. 11 illustrates an example diagram of an overview of the smart topic generation system generating a combined smart topic in accordance with one or more embodiments.

As illustrated in FIG. 11, the smart topic generation system 102 identifies a collaborating user account group 1102. For example, in one or more embodiments, user accounts of the collaborating user account group 1102 can collaborate on one or more content items. Specifically, user accounts of a collaborating user account group 1102 collaborate on content items by editing, viewing, or participating in discussions about shared content items accessible by the collaborating user account group 1102 in the content management system 104. For example, each user account in the collaborating user account has access to edit or view content items associated with the collaborating user account group 1102. Moreover, the content management system 104 can store transcripts, content, and other application data for user accounts of the collaborating user account group 1102 that can be used to generate a combined smart topic. Further details regarding permissions for sharing transcript data or application data will be discussed with respect to FIGS. 13A-13B.

As further illustrated in FIG. 11, in some embodiments, the smart topic generation system 102 receives (or generates) transcripts from video calls associated with the collaborating user account group. Specifically, the smart topic generation system 102 can receive transcripts from video calls in which client devices associated with user accounts of the collaborating user account group participated (either together as a group or independently with other user accounts outside the group). For example, each transcript comprises video call data indicating or representing the subject matter discussed by participants of the video call. As shown, the smart topic generation system 102 receives, obtains, or generates a first transcript from a first video call 1104 and a second transcript from a second video call 1106.

As further shown in FIG. 11, in one or more embodiments, the smart topic generation system 102 receives a selection of a smart topic element 1108 corresponding to a smart topic. In particular, the smart topic generation system 102 can receive an indication of a user element of the smart topic element 1108 by receiving text input of a prompt or a selection of an option to view a certain smart topic output. For example, the smart topic generation system 102 can receive text input of a prompt (e.g., for a large language model) to generate a specific combined smart topic output. As another example, the smart topic generation system 102 receives a selection of a smart topic element by receiving a selection of a smart topic element in a smart topic interface to view smart topic output associated with a certain smart topic. Further description regarding receiving selections of smart topic elements is given with respect to FIGS. 5A-5C and FIGS. 6A-6C above.

Moreover, as shown, in one or more embodiments, the smart topic generation system 102 utilizes a contextual engine 1110, a smart topic agent 1112, and a large language model 1114 to generate smart topic output. Specifically, the smart topic generation system 102 utilizes the contextual engine 1110, the smart topic agent 1112, and large language model 1114 with the first transcript from the first video call 1104 and the second transcript from the second video call 1106 to generate the combined smart topic output 1116. For example, the smart topic generation system 102 utilizes the contextual engine 1110, the smart topic agent 1112, and the large language model 1114 to parse out related subject matter and generate combined smart topic output 1116. Further description regarding the smart topic generation system 102 utilizing the contextual engine 1110, the smart topic agent 1112, and a large language model 1114 to generate a combined smart topic will be given with respect to FIG. 12.

In addition, in one or more embodiments, the smart topic generation system 102 displays a combined smart topic output 1116 in a smart topic interface. In particular, the smart topic generation system 102 displays the combined smart topic output 1116 in one or more smart topic interfaces presented on client devices associated with user accounts of the collaborating user account group. For example, the smart topic generation system 102 displays smart topic output comprising transcript data, application data (not from video call applications), content items, and/or action items associated with the collaborating user account group. In some cases, the smart topic generation system 102 generates the combined smart topic output 1116 for display on a requesting client device by analyzing data gathered from other collaborating devices in accordance with permissions and privacy settings of the collaborating user accounts for allowing other accounts to generate smart topic outputs from (their respective contributions to) the shared data from collaborative video calls.

As just suggested, in some embodiments, the smart topic generation system 102 displays combined smart topic output based on sharing permissions within the content management system 104. Specifically, the smart topic generation system 102 identifies that a user account of the collaborating user account group is only allowed to collaborate with specified content items (or folders) of the content management system 104. On the client device associated with the user, the smart topic generation system 102 can determine to display only combined smart topic output that relates to content items on which the user is allowed to collaborate. For example, if a user account is only associated with content items and/or folders for Project A, then the smart topic generation system 102 will display smart topic output associated with the content items and/or folders for Project A.

Figure 12:
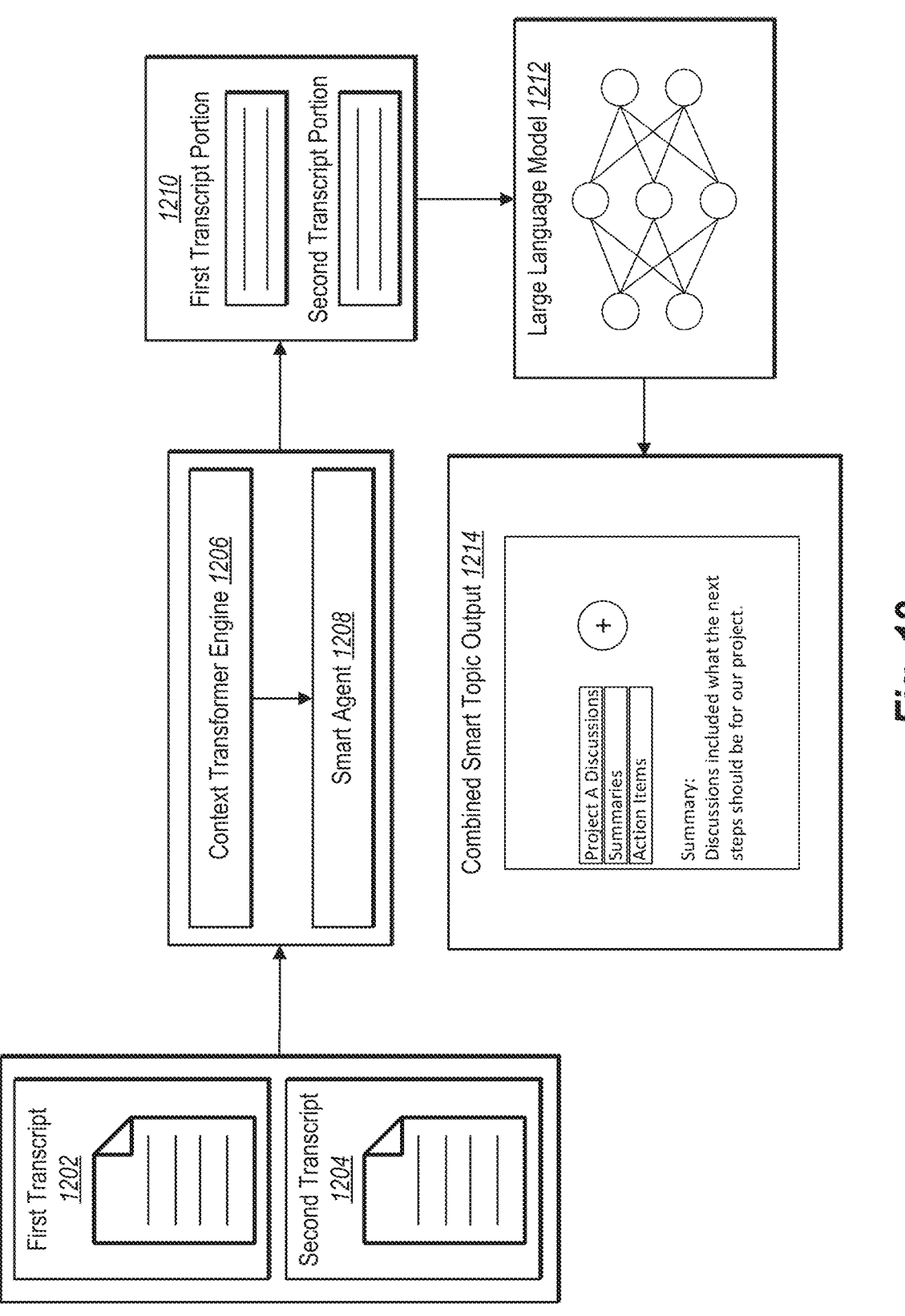
FIG. 12 illustrates an example diagram of the smart topic generation system identifying transcript portions and generating a combined smart topic in accordance with one or more embodiments.

As suggested, in one or more embodiments, the smart topic generation system 102 identifies portions of transcripts from multiple video calls from which to generate a combined smart topic output. In particular, the smart topic generation system 102 compares portions of transcripts to identify related subject matter and generate smart topic output. FIG. 12 illustrates an example diagram of the smart topic generation system identifying transcript portions and generating a combined smart topic output in accordance with one or more embodiments.

In one or more embodiments, the smart topic generation system 102 provides transcripts to a context transformer engine 1206 to identify related subject matter or subject matter related to a smart topic in the transcripts. Specifically, the smart topic generation system 102 provides first transcript 1202 and second transcript 1204 to the context transformer engine 1206 to generate portions 1210, including a first transcript portion and a second transcript portion (from the same or different transcripts). For example, the smart topic generation system 102 receives text input from a client device that comprises a prompt (e.g., for a large language model) indicating an objective (e.g., an action, task, or goal) for a combined smart topic output 1214. The smart topic generation system 102 utilizes the context transformer engine 206 to process the objective and to identify portions of first transcript 1202 and second transcript 1204 that relate to the objective and process (e.g., break downs or separate) first transcript 1202 and second transcript 1204 into to portions 1210 that relate to the objective.

As illustrated in FIG. 12, in one or more embodiments, the smart topic generation system 102 can also utilize a smart topic agent 1208. In particular, the context transformer engine 1206 can generate (and spin up resources for) smart topic agent 1208, which can execute a respective process as a part of completing an objective and in order to generate combined smart topic output 1214. For example, the context transformer engine 1206 can utilize (or generate) smart topic agent 1208 to identify and parse out information from first transcript 1202 and second transcript 1204 that relate to an objective (e.g., of a smart topic). In some cases, the context transformer engine 1206 generates a smart topic agent 1208 to complete an objective that is indicated in text input of a prompt.

As further illustrated in FIG. 12, the context transformer engine 1206 and the smart topic agent 1208 work together with a large language model 1212 to generate the smart topic output 1214. In particular, the smart topic agent 208 can process video call data within transcripts 1202 and 1204 to generate a query indicating a high-level objective for large language model 1212, which the context transformer engine 1206 ingests and dissects into lower-level queries that are executable by the large language model 1212. For example, the smart topic agent 1208 can process transcripts 1202 and 1204 to identify portions that comprise related subject matter or subject matter related to a smart topic and generate an objective for large language model 210 related to portions 1210. The context transformer engine 1206 can further refine portions 1210 to generate other objectives for large language model 1212 that work together to generate the desired combined smart topic output 1214. More details regarding the specifics of the context transformer engine, the smart topic agent, and the large language model are given with respect to FIG. 3.

In one or more embodiments, the smart topic generation system 102 receives input from a client device indicating whether or not to share transcript data associated with a user account. In particular, the smart topic generation system 102 can receive an indication from a client device indicating whether or not to include transcript data associated with the user when generating a combined smart topic. FIGS. 13A-13B illustrate an example diagram of the smart topic generation system receiving indications about sharing data from users of a collaborating user account group when generating a combined smart topic in accordance with one or more embodiments.

Specifically, FIG. 13A illustrates receiving indications from a client device about whether to include transcript data, content items, or other application data from a user account when creating (or adding a user to) a collaborating user account group. FIG. 13B illustrates receiving indications about whether or not to include transcript data, content items, or other application data from a client device that received an invitation to join a collaborating user account group.

As shown in FIG. 13A, in some embodiments, the smart topic generation system 102 can receive an indication about whether or not to include video call data when adding one or more user accounts to a collaborating user account group. Specifically, the smart topic generation system 102 can receive a selection of an option in a smart topic interface 1302 that indicates whether or not to include transcript data (and, in some cases, application data) associated with a user of the collaborating user account group. For example, an administrator account of the collaborating user account group can indicate whether to include transcript data associated with a user account when creating a new collaborating user account group. As another example, an administrator of the collaborating user account group can indicate whether to include transcript data associated with a user account when adding users to an existing collaborating user account group.

As shown in FIG. 13B, in one or more embodiments, the smart topic generation system 102 can receive an indication about whether or not to share smart topics from a client device associated with a user account that an administrator account is adding to a collaborating user account group. Specifically, the smart topic generation system 102 can include selectable options in an invitation to join a collaborating user account group. For example, smart topic generation system 102 can include the selectable options in a smart topic invitation interface 1304 that indicate, upon selection, whether or not to include transcript data or application data associated with the user account when generating combined smart topic output.

The smart topic generation system 102 can also include an option for a client device to indicate from which applications to share application data. Specifically, the smart topic generation system 102 can include an option from which the client device can indicate applications from which to include application data when generating combined smart topic output. For example, upon selection of an option to select applications, the smart topic generation system 102 can list applications from which it can extract application data. The smart topic generation system 102 can extract application data from the applications for which the smart topic generation system 102 received a share (or a yes) indication.

Figure 14:
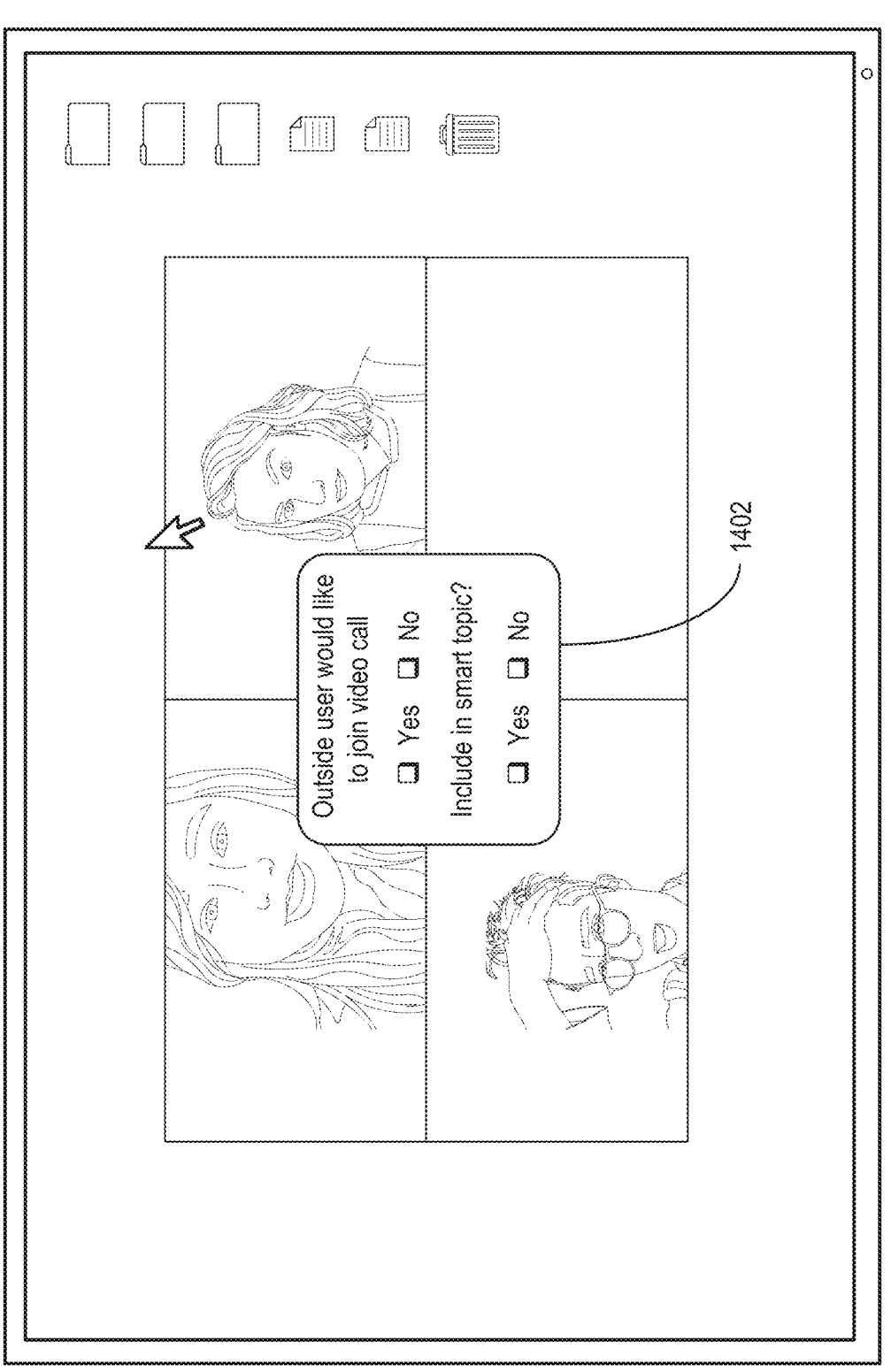
FIG. 14 illustrates an example diagram of options to include transcripts from video call participants not part of a collaborating user account group in a combined smart topic in accordance with one or more embodiments.

As indicated above, in some embodiments, the smart topic generation system 102 can determine whether to include video call data from certain participants of a video call when generating a combined smart topic. Specifically, the smart topic generation system 102 can receive an indication from a client device about whether or not to include video call data from a client device that is not associated with the collaborating user account group when generating a smart topic output. FIG. 14 illustrates an example diagram of options to include transcripts from video call participants not part of a collaborating user account group in a combined smart topic in accordance with one or more embodiments.

In one or more embodiments, the smart topic generation system 102 can determine if a user account is associated with the collaborating user account group when a client device associated with the user account joins the call. Specifically, the smart topic generation system 102 can determine, based on account data associated with the user account, whether or not the user account is associated with the collaborating user account group. For example, the smart topic generation system 102 can identify whether each client device participating in a video is associated with the collaborating user account group when the client device initiates the video stream (e.g., when they join the video call).

If a user device participating in the video is not associated with the collaborating user account group, the smart topic generation system 102 can send an indication 1402 to one or more client devices participating in the video call that are associated with users of the collaborating user account group. Specifically, the indication 1402 can include options of whether to allow the client device to participate in the video call and/or whether to include video call data from the client device when utilizing transcript data from the video call to generate a transcript. For example, the smart topic generation system 102 can generate a smart topic interface element overlaid on the video call interface that comprises the selectable options for whether or not to allow the client device to join the video call and/or whether or not to include video call data from the client device when generating combined smart topic output.

In some embodiments, the smart topic generation system 102 indicates to a client device participating in the video call that it will use the video call data. Specifically, the smart topic generation system 102 can indicate in the video call interface that it is extracting video call data or that it is generating (or will generate) combined smart topics from a transcript of the video call. For example, the smart topic generation system 102 can provide a pop-up interface element indicating it is extracting video call data, generate a filter for the video call that indicates it is extracting data, and/or require a selection of an option in a smart topic interface element indicating the client device will proceed with the video call.

Figure 16:
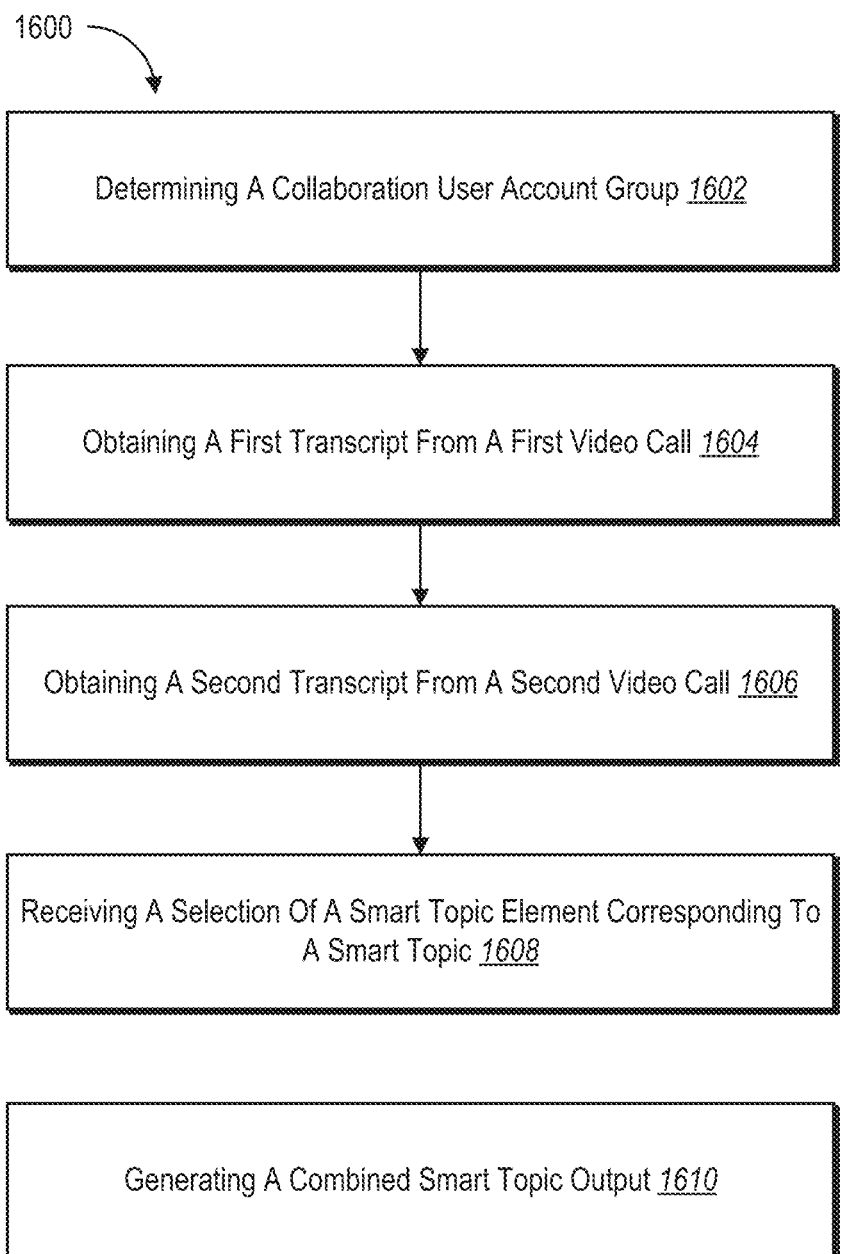
FIG. 16 illustrates a flowchart of a series of acts for generating a combined smart topic in accordance with one or more embodiments.

FIGS. 15-16, the corresponding text, and the examples provide a number of different methods, systems, devices, and non-transitory computer-readable media of the smart topic generation system. In addition to the foregoing, one or more embodiments can also be described in terms of flowcharts comprising acts for accomplishing a particular result, as shown in FIGS. 15-16. FIGS. 15-16 may be performed with more or fewer acts. Further, the acts may be performed in differing orders. Additionally, the acts described herein may be repeated or performed in parallel with one another or parallel with different instances of the same or similar acts.

As mentioned, FIG. 15 illustrates a flowchart of a series of acts 1500 for generating a smart topic output in accordance with one or more embodiments. While FIG. 15 illustrates acts according to one embodiment, alternative embodiments may omit, add to, reorder, and/or modify any of the acts shown in FIG. 15. The acts of FIG. 15 can be performed as part of a method. Alternatively, a non-transitory computer-readable medium can comprise instructions that, when executed by one or more processors, cause a computing device to perform the acts of FIG. 15. In some embodiments, a system can perform the acts of FIG. 15.

As shown in FIG. 15, the series of acts 1500 includes an act 1502 of obtaining a transcript of a video call, an act 1504 of receiving a selection of a smart topic element, an act 1506 of generating a smart topic output from the transcript of the video call, and an act 1508 of providing the smart topic output for display.

In particular, the act 1502 can include obtaining a transcript of a video call that includes video call data captured from one or more client devices interacting in a video call, the act 1504 can include receiving, from a client device of the one or more client devices, a selection of a smart topic element corresponding to the transcript of the video call and presented within a smart topic interface displayed on the client device, the act 1506 can include in response to the selection of the smart topic element, generating a smart topic output from the transcript of the video call by utilizing a smart topic agent, a context transformer engine, and a large language model, and the act 1508 can include providing the smart topic output for display within the smart topic interface presented on the client device.

For example, in one or more embodiments, the act 1506 includes identifying, utilizing the context transformer engine and the smart topic agent, a portion of the transcript of the video call comprising subject matter associated with a smart topic and providing the portion of the transcript of the video call to the large language model to generate the smart topic output.

In addition, in one or more embodiments, the series of acts 1500 includes generating, utilizing the context transformer engine, the smart topic agent as executable computer code for performing a process for a smart topic, wherein the smart topic agent is specific to a particular portion of the transcript of the video call.

Moreover, in one or more embodiments, the act 1502 includes capturing the video call data from the client device during the video call and generating the transcript of the video call from the video call data.

Further, in one or more embodiments, the series of acts 1500 includes detecting a video call interface initiating the video call on the client device and based on detecting the video call interface initiating the video call, providing a smart topic interface element as an overlay on the video call interface, wherein the smart topic interface element presents an indication that the video call data is being captured from the client device during the video call.

In one or more embodiments, the series of acts 1500 includes receiving, from the client device during the video call, a selection of a highlight option within a smart topic interface element displayed on the client device, in response to the selection of the highlight option, generating the smart topic output by generating a video call highlight from portions of the video call data corresponding to the highlight option, and providing the video call highlight for display within the smart topic interface presented on the client device.

In addition, in one or more embodiments, the series of acts 1500 includes receiving, from the client device, a text input indicating subject matter for the smart topic output and generating the smart topic output from the transcript of the video call based on the text input.

Moreover, in one or more embodiments, the series of acts 1500 includes detecting a mention of a topic during the video call and based on detecting the mention of the topic, providing, within a smart topic interface presented on the client device during the video call, a content item suggestion indicating a content item associated with the topic mentioned during the video call.

Further, in one or more embodiments, the series of acts 1500 includes identifying that a content item stored for a user account associated with the client device corresponds to the smart topic output and providing, within the smart topic interface, an option to view the content item together with the smart topic output.

Also, in one or more embodiments, the series of acts 1500 includes obtaining a transcript of a video call that includes video call data captured from one or more client devices interacting in a video call, obtain application data from an application executed by the one or more client devices separately from a video call application, receiving, from a smart topic interface displayed on a client device of the one or more client devices, a selection of a smart topic element corresponding to the transcript of the video call and the application data, in response to the selection of the smart topic element, generating a smart topic output from the transcript of the video call and the application data by utilizing a smart topic agent, a context transformer engine, and a large language model, and providing the smart topic output for display within the smart topic interface presented on the client device.

In one or more embodiments, the series of acts 1500 includes receiving, from the client device, text input indicating subject matter for the smart topic output, identifying, utilizing the context transformer engine and the smart topic agent, a portion of the transcript comprising subject matter associated with a smart topic and providing the portion of the transcript to the large language model to generate the smart topic output.

In addition, in one or more embodiments, the series of acts 1500 includes generating, from a portion of the transcript utilizing the context transformer engine, the smart topic agent as executable computer code specific to generating the smart topic output using one or more computing systems for a smart topic indicated by the portion of the transcript.

Further, in one or more embodiments, the series of acts 1500 includes comparing the transcript of the video call to the application data, based on comparing the transcript of the video call to the application data, determining that the transcript of the video call and the application data comprise related subject matter, and based on determining that the transcript of the video call and the application data comprise related subject matter, generating the smart topic output using the transcript of the video call and the application data.

Moreover, in one or more embodiments, the series of acts 1500 includes obtaining an additional transcript of an additional video call that includes additional video call data captured from the client device, identifying that the transcript of the video call and the additional transcript of the additional video call comprise related subject matter; and generating a suggested smart topic from the related subject matter of the transcript and the additional transcript. Also, in one or more embodiments, the series of acts 1500 includes providing the suggested smart topic for display in the smart topic interface, receiving, from the client device, a user selection of the suggested smart topic, and generating the smart topic output based on receiving the user selection of the suggested smart topic.

In addition, in one or more embodiments, the series of acts 1500 includes identifying, utilizing the context transformer engine and the smart topic agent, a portion of the transcript of the video call comprising subject matter associated with a smart topic, and providing the portion of the transcript of the video call to the large language model to generate the smart topic output.

Also, in one or more embodiments, the act 1508 includes providing, for display, portions of the transcript of the video call that relate to the smart topic element.

In one or more embodiments, the series of acts 1500 includes obtaining an additional transcript of an additional video call that includes additional video call data captured from the client device, generating the smart topic output from the transcript and the additional transcript, and providing the smart topic output for display by displaying portions of the transcript and the additional transcript.

As mentioned, FIG. 16 illustrates a flowchart of a series of acts 1600 for generating a combined smart topic in accordance with one or more embodiments. While FIG. 16 illustrates acts according to one embodiment, alternative embodiments may omit, add to, reorder, and/or modify any of the acts shown in FIG. 16. The acts of FIG. 16 can be performed as part of a method. Alternatively, a non-transitory computer-readable medium can comprise instructions that, when executed by one or more processors, cause a computing device to perform the acts of FIG. 16. In some embodiments, a system can perform the acts of FIG. 16.

As shown in FIG. 16, the series of acts 1600 includes an act 1602 of determining a collaboration user account group, an act 1604 of obtaining a first transcript from a first video call, an act 1606 of obtaining a second transcript from a second video call, an act 1608 of receiving a selection of a smart topic element corresponding to the smart topic, and an act 1610 of generating a combined smart topic.

In particular, the act 1602 can include determining a collaborating user account group comprising user accounts of a content management system collaborating together on one or more content items corresponding to a smart topic, the act 1604 can include obtaining a first transcript from a first video call that includes first video call data associated with a smart topic captured from a first client device associated with the collaborating user account group, the act 1606 can include obtaining a second transcript from a second video call that includes second video call data associated with the smart topic captured from a second client device associated with the collaborating user account group, the act 1608 can include receiving, from the first client device, a selection of a smart topic element corresponding to the smart topic, and the act 1610 can include in response to the selection of the smart topic element, generating a combined smart topic output from the first transcript and the second transcript by utilizing a smart topic agent, a context transformer engine, and a large language model.

For example, in one or more embodiments, the series of acts 1600 includes identifying, utilizing the context transformer engine and the smart topic agent, a first portion of the first transcript comprising subject matter associated with the smart topic and a second portion of the second transcript comprising subject matter associated with the smart topic and providing the first portion of the first transcript and the second portion of the second transcript to the large language model to generate the combined smart topic output.

In addition, in one or more embodiments, the series of acts 1600 includes receiving, from the first client device, a text input indicating subject matter for the combined smart topic output and generating the combined smart topic output based on the text input.

Further, in one or more embodiments, the act 1604 includes receiving, from the first client device, an indication of a user interaction selecting a capture element within a smart topic interface, based on receiving the indication of the user interaction, capturing the first video call data from the first client device during the first video call, and generating the first transcript from the first video call data from the first client device.

Moreover, in one or more embodiments, the series of acts 1600 includes obtaining the first transcript from the first video call based on receiving, from the first client device, a selection of a first selectable option to share transcript data and obtaining the second transcript from the second video call based on receiving, from the second client device, a selection of a second selectable option to share transcript data.

Also, in one or more embodiments, the series of acts 1600 includes identifying that a first portion of the first transcript and a second portion of the second transcript comprise subject matter corresponding to the smart topic and displaying the first portion of the first transcript and the second portion of the second transcript within a smart topic interface presented on the first client device.

In addition, in one or more embodiments, the series of acts 1600 includes generating a suggested combined smart topic based on one or more of: identifying that the first transcript and the second transcript comprise related subject matter, receiving indications of user interactions with the first transcript or the second transcript, or previous text input from the first client device to generate a previous smart topic, providing, for display within a smart topic interface presented on the first client device, a suggested smart topic element corresponding to the suggested combined smart topic, and based on receiving a selection of a suggested combined smart topic element corresponding to the suggested combined smart topic, generating the suggested combined smart topic.

Further, in one or more embodiments, the series of acts 1600 includes identifying that one or more additional content items stored for a user account associated with the collaborating user account group are associated with the smart topic and providing, within a smart topic interface on the first client device, the combined smart topic output and an option to view the one or more additional content items.

Moreover, in one or more embodiments, the series of acts 1600 includes identifying that a third client device that participated in the first video call is not associated with the collaborating user account group, receiving, from the third client device, a selection of an option to utilize transcript data from the third client device when generating the combined smart topic, and generating the combined smart topic output based on receiving the selection of the option to utilize transcript data from the third client device.

In one or more embodiments, the series of acts 1600 includes determining a collaborating user account group comprising user accounts of a content management system collaborating together on one or more content items corresponding to a smart topic, obtaining a first transcript from a first video call that includes first video call data associated with a smart topic captured from a first client device associated with the collaborating user account group, obtaining a second transcript from a second video call that includes second video call data associated with the smart topic captured from a second client device associated with the collaborating user account group, obtaining application data from an application associated with a user account of the collaborating user account group and separate from the first video call data, receiving, from the first client device, a selection of a smart topic element corresponding to the smart topic, and, in response to the selection of the smart topic element, generate a combined smart topic output from the first transcript, the second transcript, and the application data by utilizing a smart topic agent, a context transformer engine, and a large language model.

Moreover, in one or more embodiments, the series of acts 1600 includes generating, utilizing the context transformer engine, the smart topic agent as executable computer code for performing a process for the smart topic, wherein the smart topic agent is specific to a first particular portion of the first transcript and a second particular portion of the second transcript.

Also, in one or more embodiments the series of acts 1600 includes comparing the first transcript, the second transcript, and the application data, based on comparing the first transcript, the second transcript, and the application data, determining that the first transcript, the second transcript, and the application data comprise related subject matter, and generating the combined smart topic output based on determining that the first transcript, the second transcript, and the application data comprise related subject matter.

In addition, in one or more embodiments, the series of acts 1600 includes receiving, from the first client device, a text input indicating subject matter for the combined smart topic output, generating the combined smart topic output based on the text input, and providing the combined smart topic output for display within a smart topic interface presented on the first client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 17:
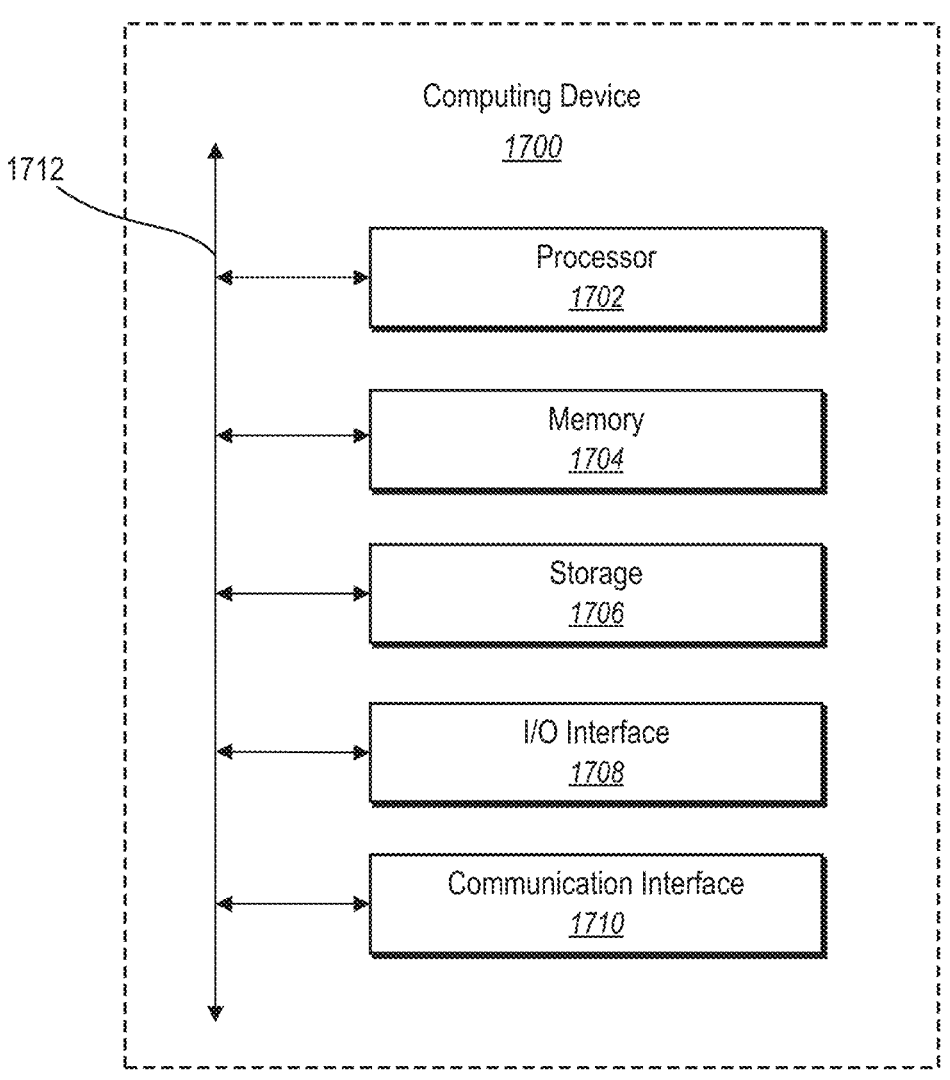
FIG. 17 illustrates a block diagram of an example computing device for implementing one or more embodiments of the present disclosure.

FIG. 17 illustrates a block diagram of an example computing device 1700 that may be configured to perform one or more of the processes described above. One will appreciate that one or more computing devices, such as the computing device 1700 may represent the computing devices described above (e.g., client device(s) 108a-108n and server(s) 106, 116). In one or more embodiments, the computing device 1700 may be a mobile device (e.g., a mobile telephone, a smartphone, a PDA, a tablet, a laptop, a camera, a tracker, a watch, a wearable device, etc.). In some embodiments, the computing device 1700 may be a non-mobile device (e.g., a desktop computer or another type of client device). Further, the computing device 1700 may be a server device that includes cloud-based processing and storage capabilities.

As shown in FIG. 17, the computing device 1700 can include one or more processor(s) 1702, memory 1704, a storage device 1706, input/output interfaces 1708 (or "I/O interfaces 1708"), and a communication interface 1710, which may be communicatively coupled by way of a communication infrastructure (e.g., bus 1712). While the computing device 1700 is shown in FIG. 17, the components illustrated in FIG. 17 are not intended to be limiting. Additional or alternative components may be used in other embodiments. Furthermore, in certain embodiments, the computing device 1700 includes fewer components than those shown in FIG. 17. Components of the computing device 1700 shown in FIG. 17 will now be described in additional detail.

In particular embodiments, the processor(s) 1702 includes hardware for executing instructions, such as those making up a computer program. As an example, and not by way of limitation, to execute instructions, the processor(s) 1702 may retrieve (or fetch) the instructions from an internal register, an internal cache, memory 1704, or a storage device 1706 and decode and execute them.

The computing device 1700 includes memory 1704, which is coupled to the processor(s) 1702. The memory 1704 may be used for storing data, metadata, and programs for execution by the processor(s). The memory 1704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1704 may be internal or distributed memory.

The computing device 1700 includes a storage device 1706 includes storage for storing data or instructions. As an example, and not by way of limitation, the storage device 1706 can include a non-transitory storage medium described above. The storage device 1706 may include a hard disk drive (HDD), flash memory, a Universal Serial Bus (USB) drive or a combination these or other storage devices.

As shown, the computing device 1700 includes one or more I/O interfaces 1708, which are provided to allow a user to provide input to (such as user strokes), receive output from, and otherwise transfer data to and from the computing device 1700. These I/O interfaces 1708 may include a mouse, keypad or a keyboard, a touch screen, camera, optical scanner, network interface, modem, other known I/O devices or a combination of such I/O interfaces 1708. The touch screen may be activated with a stylus or a finger.

The I/O interfaces 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1708 are configured to provide graphical data to a display for presentation to a user. The graphical data may be representative of one or more graphical user interfaces and/or any other graphical content as may serve a particular implementation.

The computing device 1700 can further include a communication interface 1710. The communication interface 1710 can include hardware, software, or both. The communication interface 1710 provides one or more interfaces for communication (such as, for example, packet-based communication) between the computing device and one or more other computing devices or one or more networks. As an example, and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI. The computing device 1700 can further include a bus 1712. The bus 1712 can include hardware, software, or both that connects components of computing device 1700 to each other.

Figure 18:
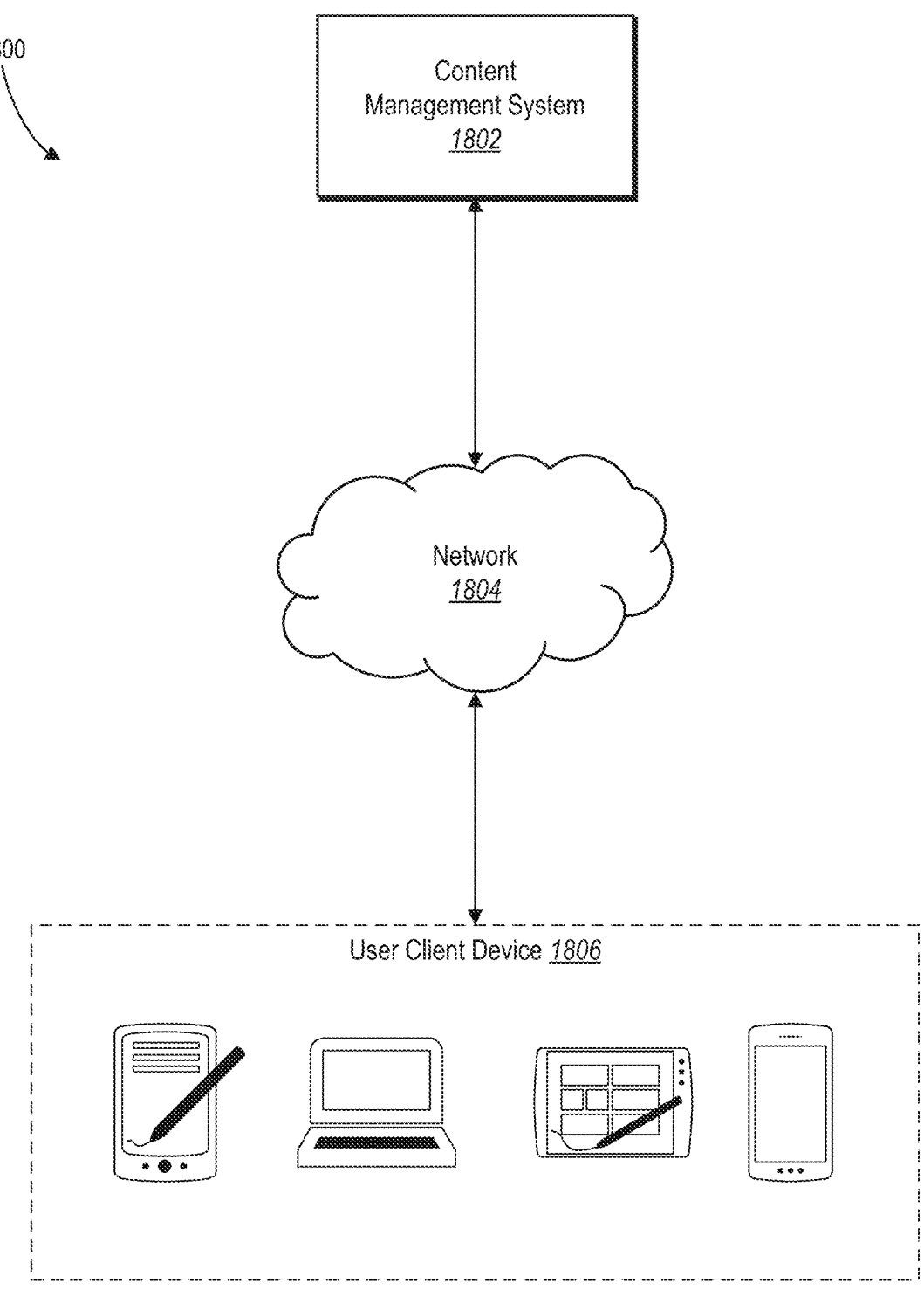
FIG. 18 illustrates a network environment of a content management system in accordance with one or more embodiments.

FIG. 18 is a schematic diagram illustrating environment 1800 within which one or more implementations of the smart topic generation system 102 can be implemented. For example, the smart topic generation system 102 may be part of a content management system 1802 (e.g., the content management system 104). Content management system 1802 may generate, store, manage, receive, and send digital content (such as digital content items). For example, content management system 1802 may send and receive digital content to and from client devices 1806 by way of network 1804. In particular, content management system 1802 can store and manage a collection of digital content. Content management system 1802 can manage the sharing of digital content between computing devices associated with a plurality of users. For instance, content management system 1802 can facilitate a user sharing a digital content with another user of content management system 1802.

In particular, content management system 1802 can manage synchronizing digital content across multiple client devices 1806 associated with one or more users. For example, a user may edit digital content using client device 1806. The content management system 1802 can cause client device 1806 to send the edited digital content to content management system 1802. Content management system 1802 then synchronizes the edited digital content on one or more additional computing devices.

In addition to synchronizing digital content across multiple devices, one or more implementations of content management system 1802 can provide an efficient storage option for users that have large collections of digital content. For example, content management system 1802 can store a collection of digital content on content management system 1802, while the client device 1806 only stores reduced-sized versions of the digital content. A user can navigate and browse the reduced-sized versions (e.g., a thumbnail of a digital image) of the digital content on client device 1806. In particular, one way in which a user can experience digital content is to browse the reduced-sized versions of the digital content on client device 1806.

Another way in which a user can experience digital content is to select a reduced-size version of digital content to request the full- or high-resolution version of digital content from content management system 1802. In particular, upon a user selecting a reduced-sized version of digital content, client device 1806 sends a request to content management system 1802 requesting the digital content associated with the reduced-sized version of the digital content. Content management system 1802 can respond to the request by sending the digital content to client device 1806. Client device 1806, upon receiving the digital content, can then present the digital content to the user. In this way, a user can have access to large collections of digital content while minimizing the amount of resources used on client device 1806.

Client device 1806 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1806 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1804.

Network 1804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1806 may access content management system 1802.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
obtaining a transcript of a video call that includes video call data captured from one or more client devices interacting in a video call;
receiving, from a client device of the one or more client devices, a selection of a smart topic element corresponding to the transcript of the video call and presented within a smart topic interface displayed on the client device;
in response to the selection of the smart topic element, generating a smart topic output from the transcript of the video call by utilizing a smart topic agent, a context transformer engine, and a large language model; and
providing the smart topic output for display within the smart topic interface presented on the client device.

2. The computer-implemented method of claim 1, wherein generating the smart topic output comprises:

identifying, utilizing the context transformer engine and the smart topic agent, a portion of the transcript of the video call comprising subject matter associated with a smart topic; and providing the portion of the transcript of the video call to the large language model to generate the smart topic output.

3. The computer-implemented method of claim 1, further comprising generating, utilizing the context transformer engine, the smart topic agent as executable computer code for performing a process for a smart topic, wherein the smart topic agent is specific to a particular portion of the transcript of the video call.

4. The computer-implemented method of claim 1, wherein obtaining the transcript of the video call further comprises:

capturing the video call data from the client device during the video call; and generating the transcript of the video call from the video call data.

5. The computer-implemented method of claim 1, further comprising:

detecting a video call interface initiating the video call on the client device; and based on detecting the video call interface initiating the video call, providing a smart topic interface element as an overlay on the video call interface, wherein the smart topic interface element presents an indication that the video call data is being captured from the client device during the video call.

6. The computer-implemented method of claim 1, further comprising:

receiving, from the client device during the video call, a selection of a highlight option within a smart topic interface element displayed on the client device;

in response to the selection of the highlight option, generating the smart topic output by generating a video call highlight from portions of the video call data corresponding to the highlight option; and providing the video call highlight for display within the smart topic interface presented on the client device.

7. The computer-implemented method of claim 1, further comprising:

receiving, from the client device, a text input indicating subject matter for the smart topic output; and generating the smart topic output from the transcript of the video call based on the text input.

8. The computer-implemented method of claim 1, further comprising:

detecting a mention of a topic during the video call; and based on detecting the mention of the topic, providing, within a smart topic interface presented on the client device during the video call, a content item suggestion indicating a content item associated with the topic mentioned during the video call.

9. The computer-implemented method of claim 1, further comprising:

identifying that a content item stored for a user account associated with the client device corresponds to the smart topic output; and providing, within the smart topic interface, an option to view the content item together with the smart topic output.

10. A non-transitory computer-readable medium storing instructions that, when executed by at least one processor, cause a computer system to:

obtain a transcript of a video call that includes video call data captured from one or more client devices interacting in a video call;

obtain application data from an application executed by the one or more client devices separately from a video call application;

receive, from a smart topic interface displayed on a client device of the one or more client devices, a selection of a smart topic element corresponding to the transcript of the video call and the application data;

in response to the selection of the smart topic element, generate a smart topic output from the transcript of the video call and the application data by utilizing a smart topic agent, a context transformer engine, and a large language model; and provide the smart topic output for display within the smart topic interface presented on the client device.

11. The non-transitory computer-readable medium of claim 10, further comprising instructions that, when executed by the at least one processor, cause the computer system to:

receive, from the client device, text input indicating subject matter for the smart topic output;

identify, utilizing the context transformer engine and the smart topic agent, a portion of the transcript comprising subject matter associated with a smart topic; and provide the portion of the transcript to the large language model to generate the smart topic output.

12. The non-transitory computer-readable medium of claim 10, further comprising instructions that, when executed by the at least one processor, cause the computer system to generate, from a portion of the transcript and utilizing the context transformer engine, the smart topic agent as executable computer code specific to generating the smart topic output using one or more computing systems for a smart topic indicated by the portion of the transcript.

13. The non-transitory computer-readable medium of claim 10, further comprising instructions that, when executed by the at least one processor, cause the computer system to:

compare the transcript of the video call to the application data;

based on comparing the transcript of the video call to the application data, determine that the transcript of the video call and the application data comprise related subject matter; and based on determining that the transcript of the video call and the application data comprise related subject matter, generate the smart topic output using the transcript of the video call and the application data.

14. The non-transitory computer-readable medium of claim 10, further comprising instructions that, when executed by the at least one processor, cause the computer system to:

obtain an additional transcript of an additional video call that includes additional video call data captured from the client device;

identify that the transcript of the video call and the additional transcript of the additional video call comprise related subject matter; and generate a suggested smart topic from the related subject matter of the transcript and the additional transcript.

15. The non-transitory computer-readable medium of claim 14, further comprising instructions that, when executed by the at least one processor, cause the computer system to:

provide the suggested smart topic for display in the smart topic interface;

receive, from the client device, a user selection of the suggested smart topic; and generate the smart topic output based on receiving the user selection of the suggested smart topic.

16. A system comprising:

at least one processor; and at least one non-transitory computer-readable storage medium storing instructions that, when executed by the at least one processor, cause the system to:

obtain a transcript of a video call that includes video call data captured from one or more client devices interacting in a video call;

receive, from a client device of the one or more client devices, a selection of a smart topic element corresponding to the transcript of the video call and presented within a smart topic interface displayed on the client device;

in response to the selection of the smart topic element, generate a smart topic output from the transcript of the video call by utilizing a smart topic agent, a context transformer engine, and a large language model; and provide the smart topic output for display within the smart topic interface presented on the client device.

17. The system of claim 16, further comprising instructions that, when executed by the at least one processor, cause the system to generate the smart topic output by:

identify, utilizing the context transformer engine and the smart topic agent, a portion of the transcript of the video call comprising subject matter associated with a smart topic; and provide the portion of the transcript of the video call to the large language model to generate the smart topic output.

18. The system of claim 16, further comprising instructions that, when executed by the at least one processor, cause the system to:

identify that a content item stored for a user account associated with the client device corresponds to the smart topic output; and provide, within the smart topic interface, an option to view the content item with the smart topic output.

19. The system of claim 16, further comprising instructions that, when executed by the at least one processor, cause the system to provide the smart topic output by providing, for display within the smart topic interface, portions of the transcript of the video call that relate to the smart topic element.

20. The system of claim 16, further comprising instructions that, when executed by the at least one processor, cause the system to:

obtain an additional transcript of an additional video call that includes additional video call data captured from the client device;

generate the smart topic output from the transcript and the additional transcript; and provide the smart topic output for display by displaying portions of the transcript and the additional transcript.

\* \* \* \* \*